(12) United States Patent
Kim et al.

(10) Patent No.: US 7,898,618 B2
(45) Date of Patent: Mar. 1, 2011

(54) ARRAY SUBSTRATE AND REFLECTIVE-TRANSMISSIVE TYPE LIQUID CRYSTAL DISPLAY APPARATUS HAVING THE SAME

(75) Inventors: Jae-Hyun Kim, Seoul (KR); Sang-Woo Kim, Suwon-si (KR); Jae-Young Lee, Seoul (KR); Yong-Kyu Jang, Suwon-si (KR); Sung-Eun Cha, Geoje-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 233 days.

(21) Appl. No.: 10/799,307

(22) Filed: Mar. 12, 2004

(65) Prior Publication Data

US 2004/0183967 A1 Sep. 23, 2004

(30) Foreign Application Priority Data

Mar. 17, 2003 (KR) ...................... 10-2003-0016477

(51) Int. Cl.
*G02F 1/1335* (2006.01)
(52) U.S. Cl. ...................................................... 349/114
(58) Field of Classification Search ................. 349/106, 349/113, 114
See application file for complete search history.

(56) References Cited

U.S. PATENT DOCUMENTS

| | | | | |
|---|---|---|---|---|
| 5,767,927 A * | 6/1998 | Jang | ............................. | 349/39 |
| 5,856,432 A * | 1/1999 | Auman et al. | ................ | 528/353 |
| 6,522,376 B1 * | 2/2003 | Park et al. | ..................... | 349/113 |
| 6,580,480 B2 * | 6/2003 | Baek et al. | .................... | 349/113 |
| 6,704,081 B2 * | 3/2004 | Ha et al. | ...................... | 349/114 |
| 6,720,580 B2 * | 4/2004 | Kim et al. | ...................... | 257/72 |
| 6,774,965 B2 * | 8/2004 | Nakashima et al. | ......... | 349/114 |
| 6,897,925 B2 * | 5/2005 | Kim et al. | .................... | 349/114 |
| 6,922,219 B2 * | 7/2005 | Jin et al. | ...................... | 349/113 |
| 7,015,996 B2 * | 3/2006 | Sakamoto et al. | ........... | 349/113 |
| 2002/0033918 A1 * | 3/2002 | Shigeno et al. | ............. | 349/114 |
| 2002/0036730 A1 * | 3/2002 | Baek et al. | ................... | 349/106 |
| 2002/0054256 A1 * | 5/2002 | Kim et al. | .................... | 349/113 |
| 2002/0063824 A1 * | 5/2002 | Ha et al. | ...................... | 349/113 |
| 2003/0067570 A1 * | 4/2003 | Okamoto et al. | ............ | 349/113 |
| 2003/0067575 A1 * | 4/2003 | Acosta et al. | ................ | 349/123 |

* cited by examiner

*Primary Examiner*—David Nelms
*Assistant Examiner*—Lucy P Chien
(74) *Attorney, Agent, or Firm*—F. Chau & Associates, LLC

(57) ABSTRACT

In an LCD apparatus, a reflecting plate, which is formed on a pixel electrode connected to a switching device formed on an array substrate, defines a first area from which a natural light is reflected and a second area through which an artificial light is transmitted. The reflecting plate is partially extended to and overlapped with the second area depending upon a rubbing direction of the array substrate. Thus, the reflective-transmissive type LCD apparatus may prevent occurrence of the after-image, and may enhance a contrast ratio thereof when operated in a transmissive mode.

26 Claims, 26 Drawing Sheets

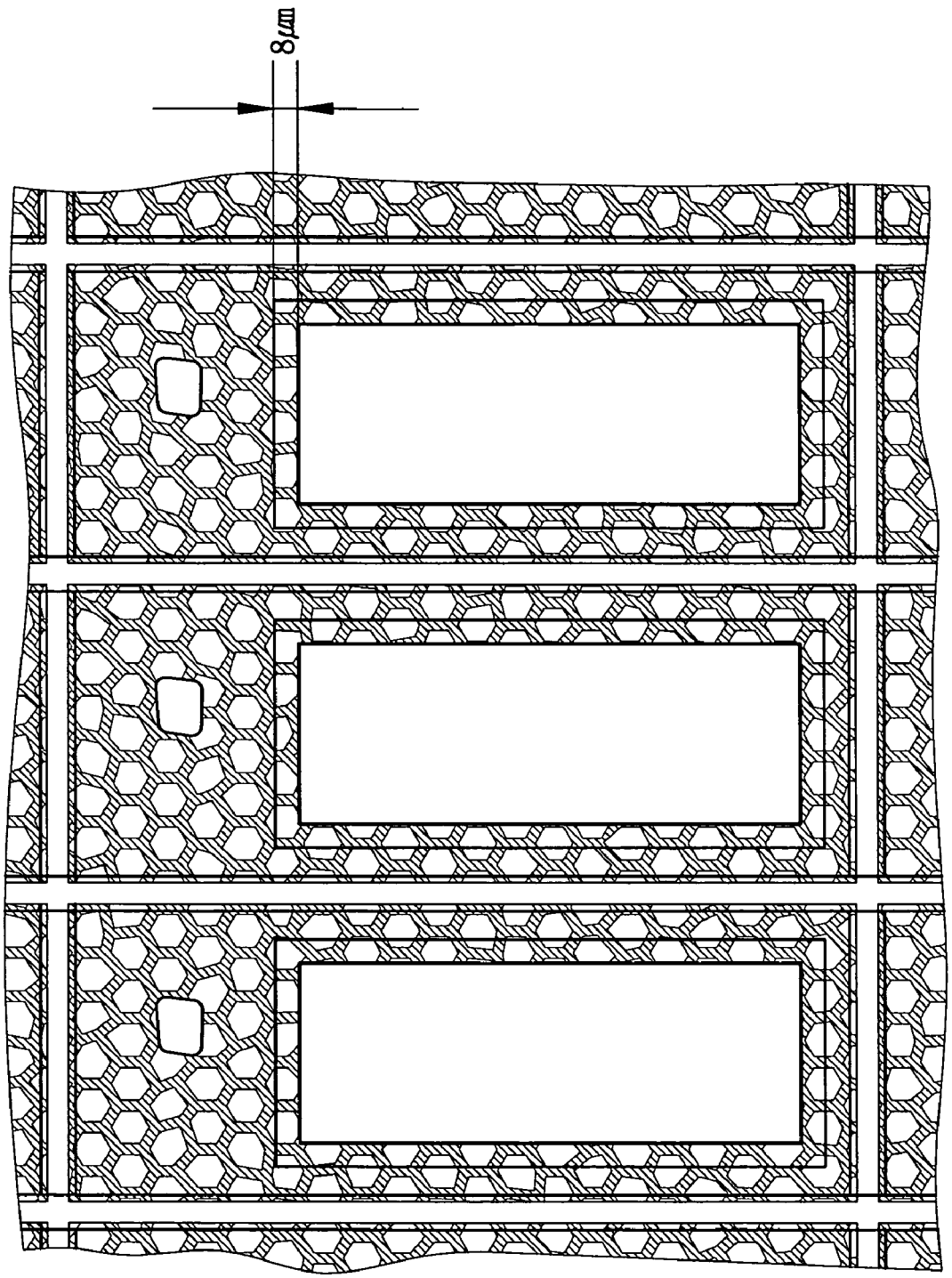

ARRAY SUBSTRATE AND REFLECTIVE-TRANSMISSIVE TYPE LIQUID CRYSTAL DISPLAY APPARATUS HAVING THE SAME

CROSS-REFERENCE TO RELATED APPLICATION

This application relies for priority upon Korean Patent Application No. 2003-16477 filed on Mar. 17, 2003, the contents of which are herein incorporated by reference in its entirety.

BACKGROUND OF THE INVENTION

1. Field of the Invention

The present invention relates to an array substrate and a reflective-transmissive type liquid crystal display (LCD) apparatus having the array substrate, and more particularly to an array substrate capable of removing an afterimage and enhancing a contrast ratio and a reflective-transmissive type LCD apparatus having the array substrate.

2. Description of the Related Art

In general, a reflective-transmissive type LCD apparatus employing liquid crystal of a mixed twisted nematic (MTN) mode has advantages, for example, such as a high contrast ratio, a high productivity, a high color quality and so on. However, since the reflective-transmissive type LCD apparatus has the liquid crystal twisted, a light transmittance may be deteriorated while the reflective-transmissive type LCD apparatus is operated in a transmissive mode. The liquid crystal of the MTN mode is, generally, twisted in an angle smaller than 90 degrees.

In recent, in order to prevent deterioration of the light transmittance of the MTN mode liquid crystal, a homogeneous mode liquid crystal that the liquid crystal is not twisted is widely used.

In case that the liquid crystal is aligned in the homogenous mode, a cell gap corresponding to a first area and a cell gap corresponding to a second area are different from each other. Especially, when a value of $\Delta nd$ corresponding to the first area is 0.13 μm and a value of $\Delta nd$ corresponding to the second area is 0.26 μm, the cell gap corresponding to the second area is twice larger than the cell gap corresponding to the first area. If the liquid crystal has an anisotropic refractive index ($\Delta n$) of 0.078, the cell gap corresponding to the first area is 1.7 μm and the cell gap corresponding to the second area is 3.3 μm.

The cell gap corresponding to the first area may be different from the cell gap corresponding to the second area due to an organic insulating layer formed on an array substrate. A disclination, however, may occur at a boundary area between the first area and the second area, and the light may be leaked due to a distorted alignment of the liquid crystal. As a result, an afterimage may appear on a display screen, and a contrast ratio may be lowered.

BRIEF SUMMARY OF THE INVENTION

The present invention provides an array substrate capable of removing an afterimage and enhancing a contrast ratio.

The present invention also provides a reflective-transmissive type liquid crystal display apparatus having the above array substrate.

In one aspect of the present invention, an array substrate includes a substrate, a switching device formed in a pixel area defined by a gate line and a source line, a pixel electrode connected to a drain electrode of the switching device, and a reflecting plate formed on the pixel electrode.

The gate line extended in a first direction is arranged in a second direction substantially perpendicular to the first direction, and the source line extended in the second direction is arranged in the first direction.

The switching device includes a gate electrode extended from the gate line, a source electrode extended from the source line and the drain electrode spaced apart from the source electrode.

In another aspect of the present invention, a reflective-transmissive type liquid crystal display apparatus includes an upper substrate, a lower substrate, and a liquid crystal layer interposed between the upper and lower substrates.

The upper substrate includes a color pixel, and the color pixel has a first thickness at a position corresponding to a first area and a second thickness at a position corresponding to a second area, which is thicker than the first thickness.

The lower substrate includes a switching device, a pixel electrode connected to a drain electrode of the switching device, and a reflecting plate formed on the pixel electrode with a transmission window.

In still another aspect of the invention, in a reflective-transmissive type liquid crystal display apparatus that displays an image using an artificial light or a natural light passing through a liquid crystal layer, the reflective-transmissive type liquid crystal display apparatus includes a first substrate, a switching device formed in a pixel area that is defined by a gate line and a source line disposed on the first substrate, a pixel electrode connected to a drain electrode of the switching device, and a reflecting plate disposed on the pixel electrode The gate line extended in a first direction is arranged in a second direction substantially perpendicular to the first direction, and the source line extended in the second direction is arranged in the first direction.

In still another aspect of the invention, in a reflective-transmissive type liquid crystal display apparatus that displays an image using an artificial light or a natural light passing through a liquid crystal layer, the reflective-transmissive type liquid crystal display apparatus includes a first substrate, a switching device formed in a pixel area that is defined by a gate line and a source line disposed on the first substrate, an insulating layer formed on the switching device and the first substrate with a contact hole through which the drain electrode is partially exposed, a pixel electrode partially formed on the insulating layer, and connected to the drain electrode through the contact hole, an organic insulating layer formed on the insulating layer and the pixel electrode to expose the insulating layer corresponding to the second area, an protecting layer formed on the organic layer corresponding to the first area, and a reflecting plate disposed on the protecting layer.

The gate line extended in a first direction is arranged in a second direction substantially perpendicular to the first direction, the source line extended in the second direction is arranged in the first direction The switching device includes a gate electrode extended from the gate line, a source electrode extended from the source line and the drain electrode spaced apart from the source electrode.

According to the reflective-transmissive type liquid crystal display apparatus, a portion of the reflecting plate is extended to and overlapped with the second area depending upon the rubbing direction of the liquid crystal layer. Thus, the reflective-transmissive type LCD apparatus may prevent occurrence of the afterimage and leakage of light, and may enhance a contrast ratio thereof when operated in a transmissive mode.

BRIEF DESCRIPTION OF THE DRAWINGS

The above and other advantages of the present invention will become readily apparent by reference to the following detailed description when considered in conjunction with the accompanying drawings wherein:

FIGS. 14A to 14D are plan views showing various reflective-transmissive type LCD apparatuses.

DESCRIPTION OF THE PREFERRED EMBODIMENTS

Hereinafter, the present invention will be explained in detail with reference to the accompanying drawings.

Figure 1:
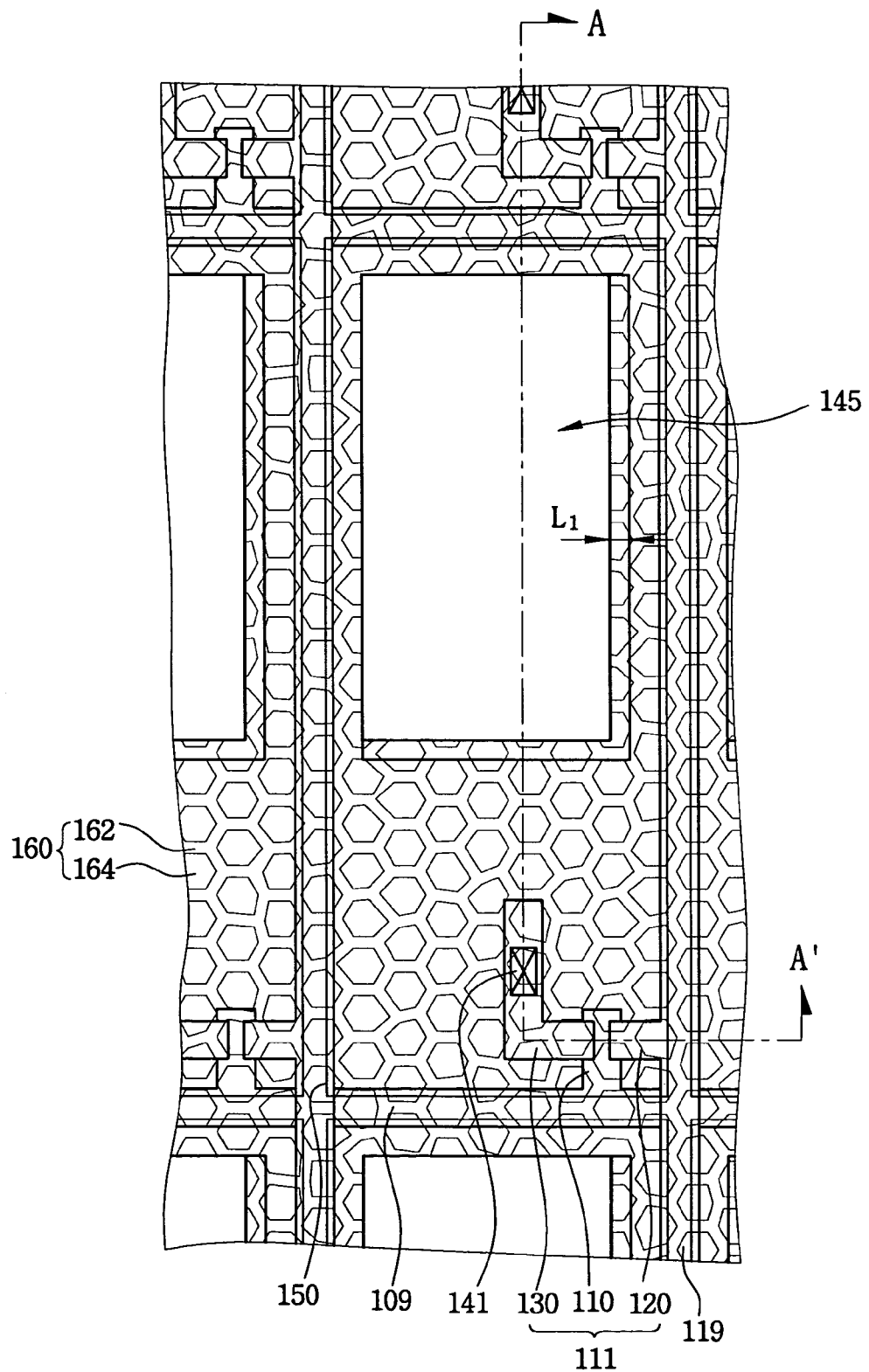
FIG. 1 is a plan view showing a reflective-transmissive type liquid crystal display apparatus according to an exemplary embodiment of the present invention.

FIG. 1 is a plan view showing a reflective-transmissive type liquid crystal display apparatus according to an exemplary embodiment of the present invention. In this exemplary embodiment, an array substrate for a reflective-transmissive type liquid crystal display apparatus having a structure of top-ITO will be described.

Referring to FIG. 1, an array substrate 100 (see FIG. 2) includes a gate line 109 extended in a substantially horizontal direction and arranged in a substantially vertical direction, a source line 119 extended in the vertical direction and arranged in the horizontal direction, a switching device TFT formed in an area defined by the gate and source lines 109 and 119, a pixel electrode 150 electrically connected to a drain electrode 130, and a reflecting plate 160 formed on the pixel electrode 150.

The switching device TFT includes a gate electrode 110 extended from the gate line 109 and, a source electrode 120 extended from the source line 119 and a drain electrode 130 spaced apart from the source electrode 120.

The array substrate 100 may include a plurality of gate lines and a plurality of source lines instead of including a single gate line and a single source line as described above.

The reflecting plate 160 includes an edge that is partially extended from the first area to the second area and connected to the pixel electrode 150.

In this exemplary embodiment, the reflecting plate 160 formed on the first area is partially extended to a transmissive window 145 in consideration of a rubbing direction of an alignment layer (not shown) formed on the array substrate 100, and connected to the pixel electrode 150 disposed thereunder. Particularly, when viewed the array substrate 100 at an upper position in FIG. 1, the reflecting plate 160 is connected to the pixel electrode 150 due to an extension of edge of the first area adjacent to bottom and right sides of the transmissive window 145 in case of rubbing the alignment layer in 10 o'clock.

Figure 2:
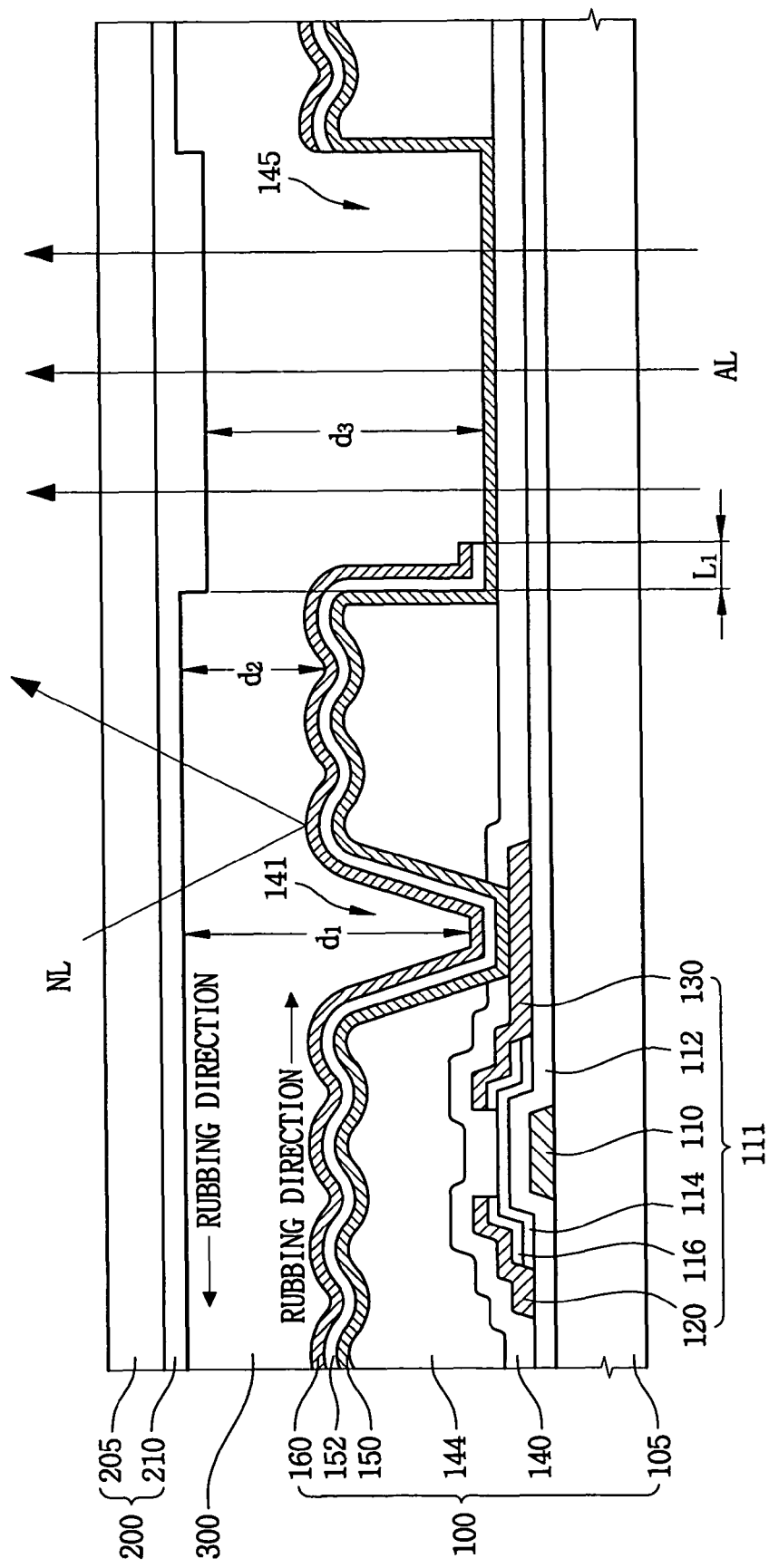
FIG. 2 is a cross-sectional view taken along the line A-A' of FIG. 1.

FIG. 2 is a cross-sectional view taken along the line A-A' of FIG. 1.

Referring to FIGS. 1 and 2, the reflective-transmissive type liquid crystal display (LCD) apparatus includes the array substrate 100, a color filter substrate 200 and a liquid crystal layer 300 disposed between the array substrate 100 and the color filter substrate 200.

The array substrate 100 includes a transparent substrate 105, a switching device 111 having a gate electrode 110 formed on the transparent substrate 105, a gate insulating layer 112 formed on the gate electrode 110 and the transparent substrate 105, a semiconductor layer 114, an ohmic contact layer 116 and a source electrode 120, a source-drain insulating layer 140 formed on the switching device 111 and the gate insulating layer 112, and an organic insulating layer 144 formed on the source-drain insulating layer 112. The source-drain insulating layer 112 and the organic insulating layer 144 are formed with a first contact hole 141 so as to partially expose the drain electrode 130. The organic insulating layer 144 further includes a groove 162 and a protrusion 164 formed on a surface thereof.

Additionally, the array substrate 100 includes the pixel electrode 150 that is formed on the organic insulating layer 144 and connected to the drain electrode 130 through the first contact hole 141, an protecting layer 152 formed on the pixel electrode 150 and the reflecting plate 160 formed on the protecting layer 152. The pixel electrode 150 acts as a transmissive electrode through which light is transmitted, and comprises indium tin oxide (ITO), tin oxide (TO) or indium zinc oxide (IZO), etc. Although not shown in FIG. 2, the array substrate 100 may include a capacitor line (not shown) that acts as a storage capacitor with the pixel electrode 150. The capacitor line is formed and spaced apart from the switching device 111 before the pixel electrode 150 is formed.

In this exemplary embodiment, the reflecting plate 160 is formed on the protecting layer 152 corresponding to the first area. The edge of the reflecting plate 160, which is adjacent to the second area, is partially extended toward the second area by a predetermined length "L". In FIG. 2, the reflecting plate 160 insulated from the pixel electrode 150 by the protecting layer 152 disposed therebetween is shown. The protecting layer 152, however, may be partially removed, so that the reflecting plate 160 may be electrically connected to the pixel electrode 150.

The color filter substrate 200 includes a transparent substrate 205, a black matrix (not shown) formed on the transparent substrate 205 so as to define red (R), green (G) and blue (B) pixel areas, a color pixel layer 210 formed in the R, G and B pixel areas and a surface passivation layer (not shown) for protecting the black matrix and the color pixel layer 210. In case that the color pixel layer 210 is formed to be partially overlapped with an adjacent color pixel layer, the black matrix of the color filter substrate 200 may be removed. The color filter substrate 200 may further include a common electrode layer (not shown) formed on the surface passivation layer.

The liquid crystal layer 300 disposed between the array substrate 100 and the color filter substrate 200 transmits natural light NL passing through the color filter substrate 200 or transmits artificial light AL passing through a transmission window 145 in response to a voltage signal applied to the pixel electrode 150 of the array substrate 100 and a voltage signal applied to a common electrode layer (not shown) of the color filter substrate 200. The liquid crystal layer 300 has a different cell gap at each of a first area at which a first contact hole 141 is formed, a second area at which the first contact hole 141 is not formed and a third area. The first and second areas correspond to the reflection area, and the third area corresponds to the second area. The cell gap of the liquid crystal layer 300 corresponding to the first area, the cell gap of the liquid crystal layer 300 corresponding to the second area and the cell gap of the liquid crystal layer 300 are represented as d1, d2 and d3, respectively. Here, a thickness of the liquid crystal layer 300 for each different cell gap meets a condition of $d2<d1<d3$.

Especially, assuming that the anisotropic refractive index of liquid crystal molecules of the liquid crystal layer 300 and the cell gap are represented by $\Delta n$ and d, respectively, the liquid crystal layer 300 has a condition of $\Delta nd1$ in the first area because the source-drain insulating layer 140 and the organic insulating layer 144 are not formed in the first area, the liquid crystal layer 300 has a condition of $\Delta nd2$ in the second area because the source-drain insulating layer 140 and the organic insulating layer 144 are formed in the first area, and the liquid crystal layer 300 has a condition of $\Delta nd3$ in the third area because only the source-drain insulating layer 140 is formed in the first area.

The cell gap concerning the first area and the second area depends upon the liquid crystal molecules of the liquid crystal layer 300 and an optical film disposed on and under the liquid crystal layer 300. In general, the cell gap d2 corresponding to the first area is less than about 1.7 μm, and the cell gap d3 corresponding to the second area is less than about 3.3 μm.

It is also that since the liquid crystal layer 300 is treated by homogeneous alignment treatment, the liquid crystal layer 300 includes the liquid crystal molecules having a twisted angle of zero.

In FIG. 2, in order to allow the liquid crystal molecules to have the twisted angle of zero, an alignment layer (not shown) formed on the array substrate 100 is rubbed in a right direction that is a first direction, and an alignment layer (not shown) formed on the color filter substrate 200 is rubbed in a left direction that is a second direction. The first and second directions are opposite to each other. Thus, an edge of the reflecting plate 160, which is adjacent to the transmission window 145 and positioned at a side of the switching device 111, will be extended in the transmission window 145. If the alignment layer formed on the array substrate 100 is rubbed in the second direction and the alignment layer formed on the color filter substrate 200 is rubbed in the first direction, an edge of the reflecting plate 160, which is adjacent to the transmission window 145 and positioned at a far side from the switching device 111, will be extended in the transmission window 145.

A method for applying the voltage to both sides of the liquid crystal layer 300 after forming the pixel electrode 150 and the common electrode layer (not shown) on the array substrate 100 and the color filter substrate 200, respectively, has been described. In case that the common electrode layer (not shown) is, however, not formed on the color filter substrate 200, the reflective-transmissive type LCD apparatus may reflect the natural light NL and transmit the artificial light AL by applying various voltages having different voltage levels from each other onto one surface of the array substrate 100.

Figure 3:
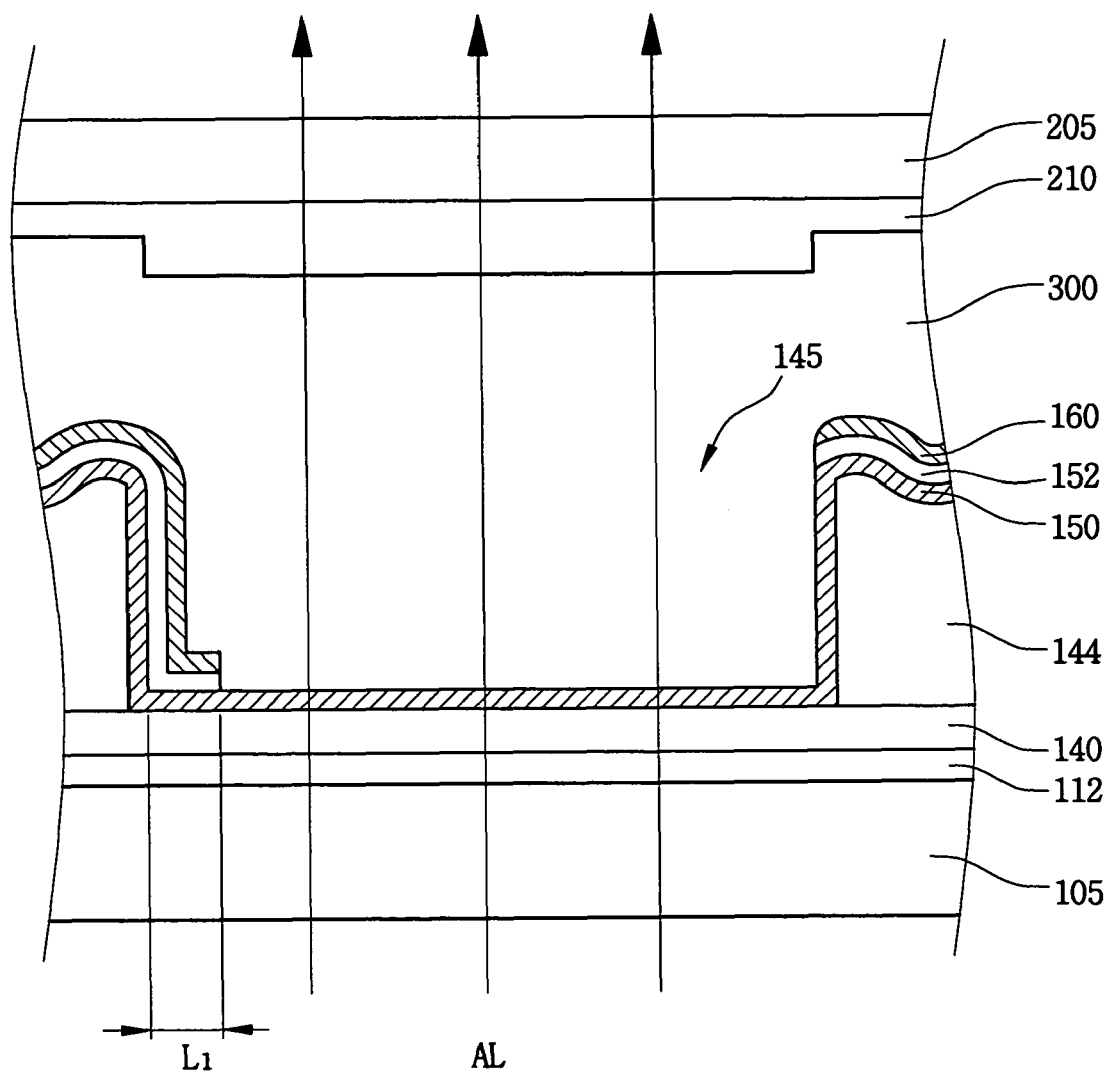
FIG. 3 is an enlarged view showing a boundary area between the first area and the second area of the reflective-transmissive type LCD apparatus shown in FIG. 2.

FIG. 3 is an enlarged view showing a boundary area between the first area and the second area of the reflective-transmissive type LCD apparatus shown in FIG. 2.

Referring to FIGS. 2 and 3, the reflecting plate 160 formed on the organic insulating layer 144 is partially extended to the transmission window 145.

That is, a portion of the edge of the reflecting plate 160, which is adjacent to the transmission window 145, is extended to the transmission window 145 according to the rubbing direction for the liquid crystal layer 300. Thus, loss of the natural light NL and the artificial light AL due to a transmittance and a reflectance of the reflective-transmissive type LCD apparatus may be reduced. Furthermore, the reflective-transmissive type LCD apparatus may prevent occurrence of the afterimage and leakage of the light caused by a difference of the cell gap between the first area and the second area thereof.

FIGS. 4A to 4D are views illustrating a method of manufacturing the reflective-transmissive type LCD apparatus shown in FIG. 1. Particularly, in FIGS. 4A to 4D, a method of manufacturing the array substrate shown in FIG. 1 will be described.

Figure 4A:
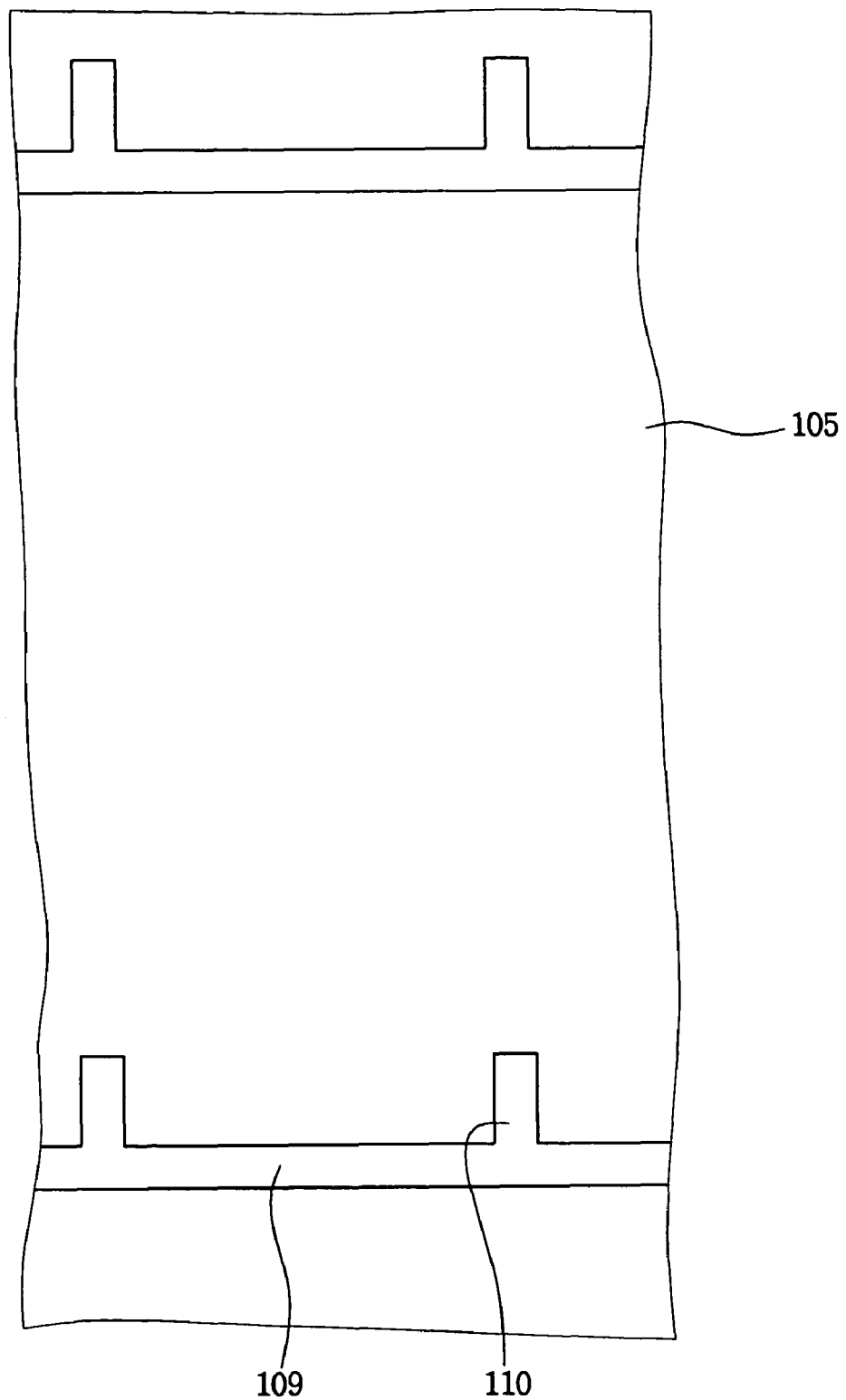
FIGS. 4A to 4D are views illustrating a method of manufacturing the reflective-transmissive type LCD apparatus shown in FIG. 1.

Referring to FIG. 4A, a metal layer comprising a metal material, for example, such as tantalum (Ta), titanium (Ti), molybdenum (Mo), aluminum (Al), chromium (Cr), copper (Cu), tungsten (W), etc., is formed on the transparent substrate 105 comprising an insulating material, for example, such as glass, ceramic and so on. Subsequently, the gate line 109 extended in the horizontal direction and successively arranged in the vertical direction and the gate electrode 110 extended from the gate line 109 are formed when the metal layer is patterned.

Although not shown in FIG. 4A, a storage electrode line (not shown) is also formed when the gate electrode 110 is formed. In addition, to form the gate insulating layer 112 (see FIG. 1), silicon nitride is deposited over the transparent substrate 105 using a plasma-enhanced chemical vapor deposition method. In the following, an amorphous silicon layer and an $n^+$ amorphous silicon layer are successively formed on the gate insulating layer 112, and patterned to form the semiconductor layer 114 and the ohmic contact layer 116 (see FIG. 1).

Figure 4B:
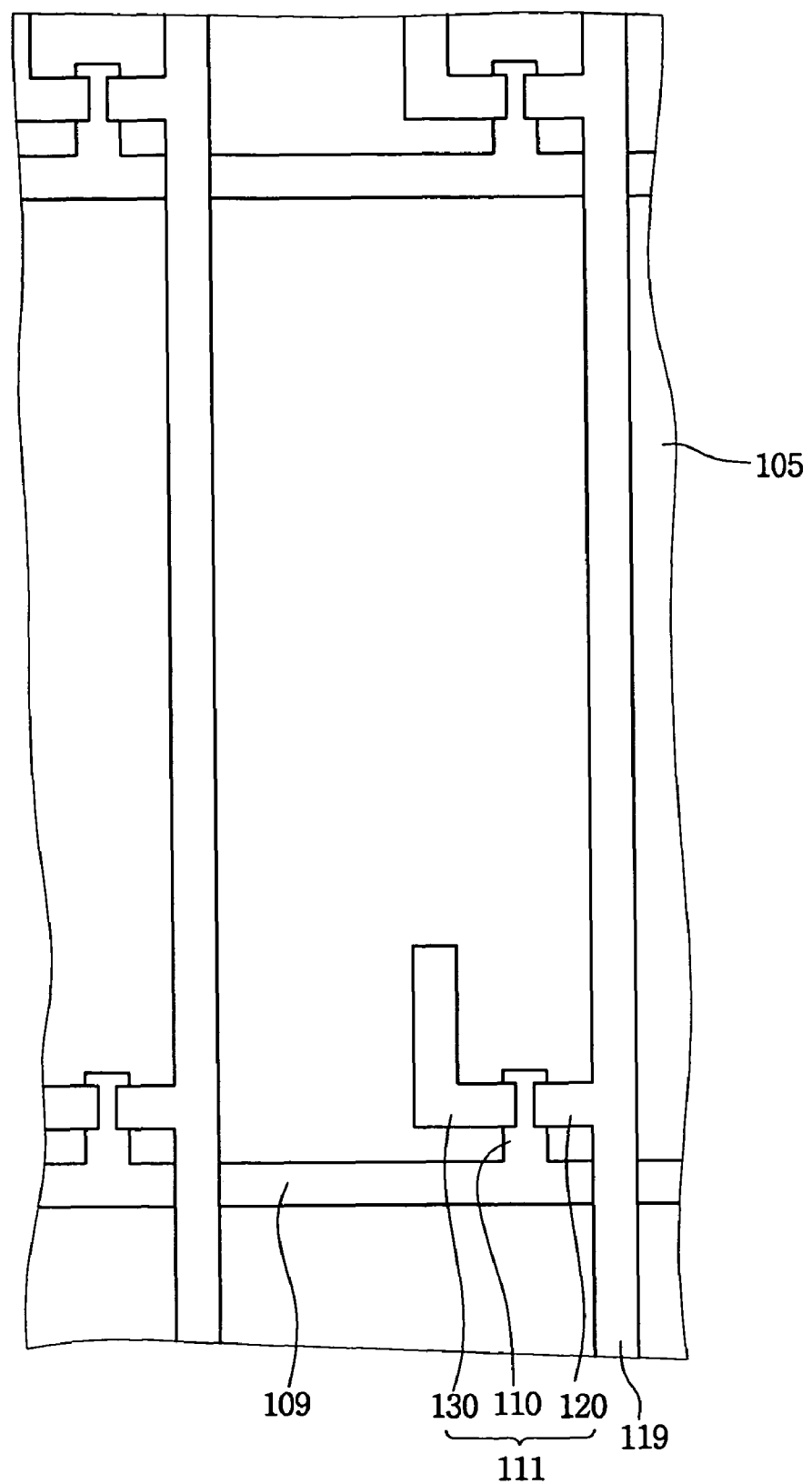

As shown in FIG. 4B, a metal layer having a metal material, for example, such as tantalum (Ta), titanium (Ti), molybdenum (Mo), aluminum (Al), chromium (Cr), copper (Cu), tungsten (W), etc., is formed on the transparent substrate 105 on which the resultant structure shown in FIG. 4A is formed. Later, when the metal layer is patterned, the source line 119 extended in the vertical direction and successively arranged in the horizontal direction, the source electrode 120 extended from the source line 119 and the drain electrode 130 spaced apart from the source electrode 120 are formed (refer to FIG. 1).

Figure 4C:
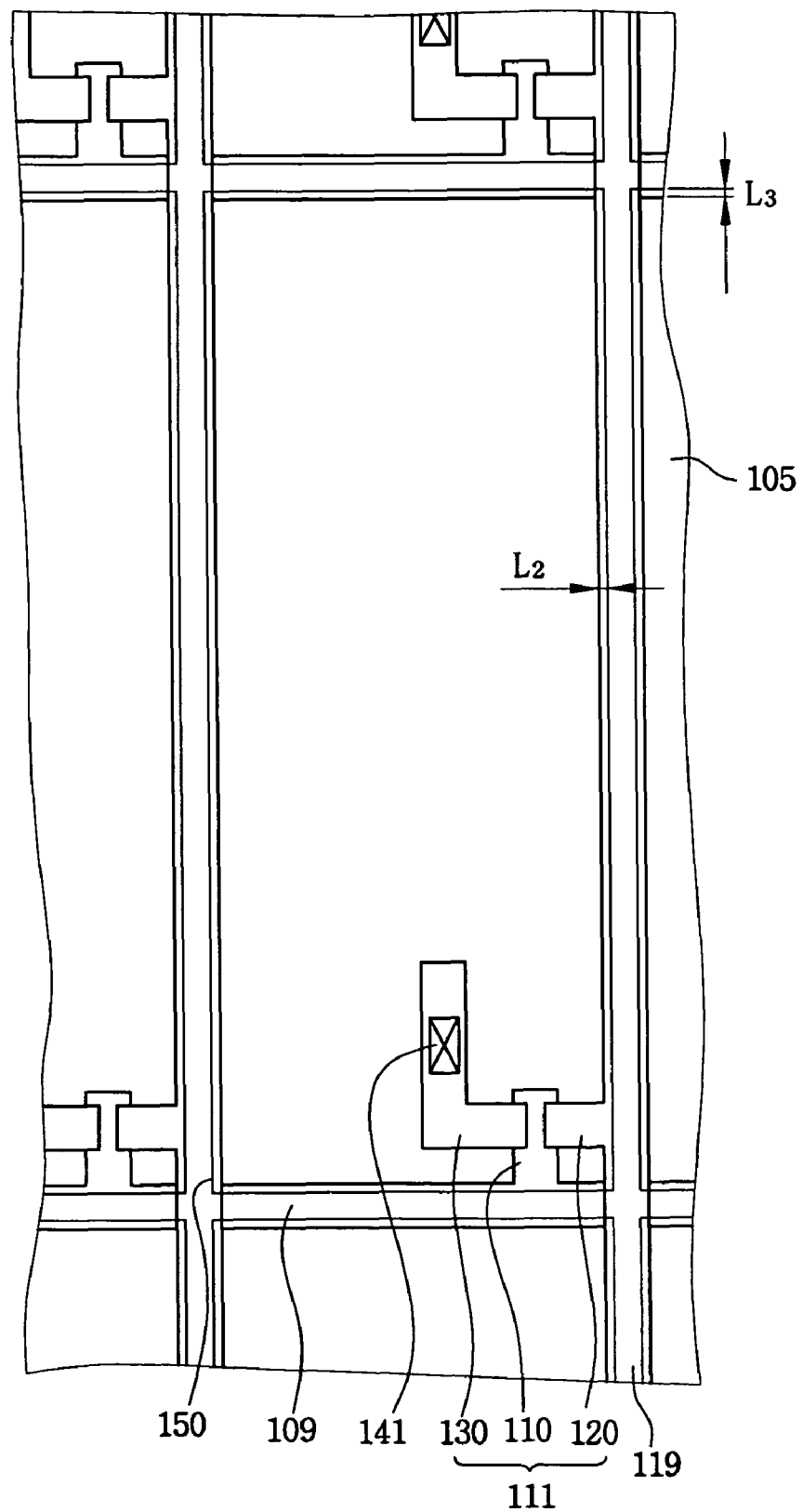

Referring to FIG. 4C, the source-drain insulating layer 140 and the organic insulating layer 144 are successively formed on the resultant structure of the transparent substrate 105 shown in FIG. 4B. Then, the organic insulating layer 144 corresponding to the second area, and the organic insulating layer 144 and the source-drain insulating layer 140 corresponding to the drain electrode 130 are removed to form the first contact hole 141 and the transmission window 145. In order to enhance a reflection efficiency of the natural light NL incident into the reflecting plate 160 (refer to FIG. 1), an upper surface of the organic insulating layer 144 has a concavo-convex shape.

An ITO layer is formed on the pixel area defined by the gate line 109 and the source line 119 so as to form the pixel electrode 150. The pixel electrode 150 is electrically connected to the drain electrode 130 through the first contact hole 141. The pixel electrode 150 may be formed by forming the ITO layer on the source-drain insulating layer 140 and the organic insulating layer 144 and by patterning the ITO formed on the source-drain insulating layer 140 and the organic insulating layer 144, such that the patterned ITO remains only on the pixel area. The pixel electrode 150 may be formed by forming the ITO only on the pixel area. As shown in FIG. 4C, when a distance L2 where the pixel electrode 150 and the source line 119 are overlapped with each other and a distance L3 where the pixel electrode 150 and the gate line 109 are overlapped with each other become smaller, an opening ratio of the transmission window may be enhanced.

Figure 4D:
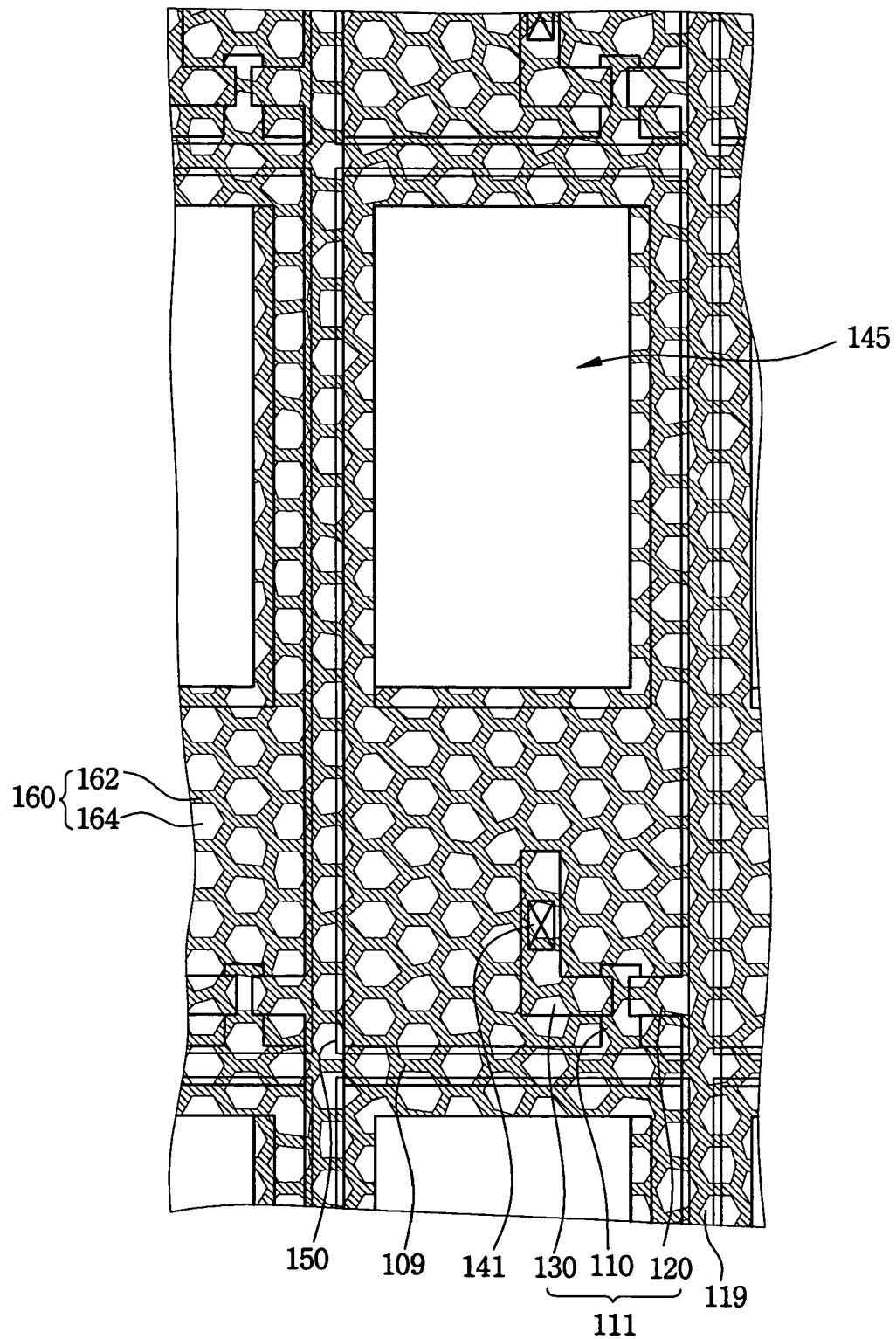

Referring to FIG. 4D, the reflecting plate 160 is formed on a position corresponding to the pixel area defined by the gate line 109 and the source line 119. The reflecting plate 160 includes a groove 162 and a protrusion 164 corresponding to the concavo-convex shape of the organic insulating layer 144 so as to enhance the reflection efficiency of the natural light NL. The reflecting plate 160 is also formed on a position corresponding to the first area, and partially extended to the second area.

In FIGS. 4A to 4B, a structure that an end of the pixel electrode is partially overlapped with the gate line 109 and the source line 119 adjacent thereto has been shown. In this exemplary embodiment, the pixel electrode 150, however, may be acted as a capacitor with the gate line 109 or the source line 119, so that a parasitic capacitance may occur.

In order to reduce the parasitic capacitance, a method that reduces an overlapped area of the pixel electrode 150 and the gate line 109, or an overlapped area of the pixel electrode 150 and the source line 119 may be used.

FIGS. 5A to 5D are views illustrating a method of manufacturing a reflective-transmissive type LCD apparatus according to another exemplary embodiment of the present invention. In this exemplary embodiment, an array substrate for a reflective-transmissive type LCD apparatus having a top-ITO structure will be described. A reflective-transmissive type LCD apparatus having a pixel electrode not overlapped with a source line will be also described. In FIGS. 5A to 5D, the same reference numerals denote the same elements in FIGS. 4A to 4D, and thus the detailed descriptions of the same elements will be omitted. Particularly, in FIGS. 5A and 5B, the same elements represented by the same reference numerals in FIGS. 4A and 4B are formed through same processes of the same elements in FIGS. 4A and 4B, and thus the detailed descriptions of the same processes will be also omitted.

Figure 5A:
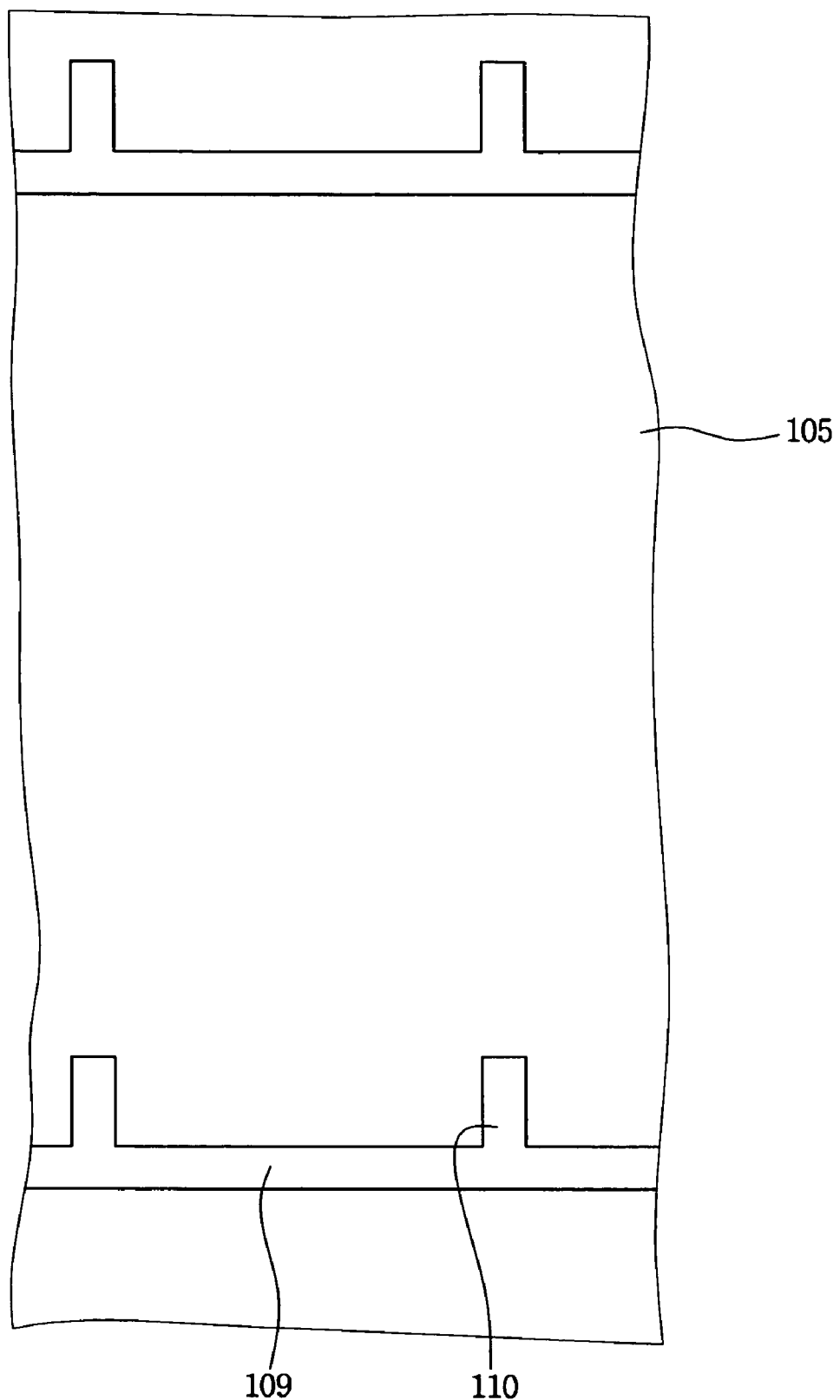
FIGS. 5A to 5D are views illustrating a method of manufacturing the reflective-transmissive type LCD apparatus according to another exemplary embodiment of the present invention.
Figure 5B:
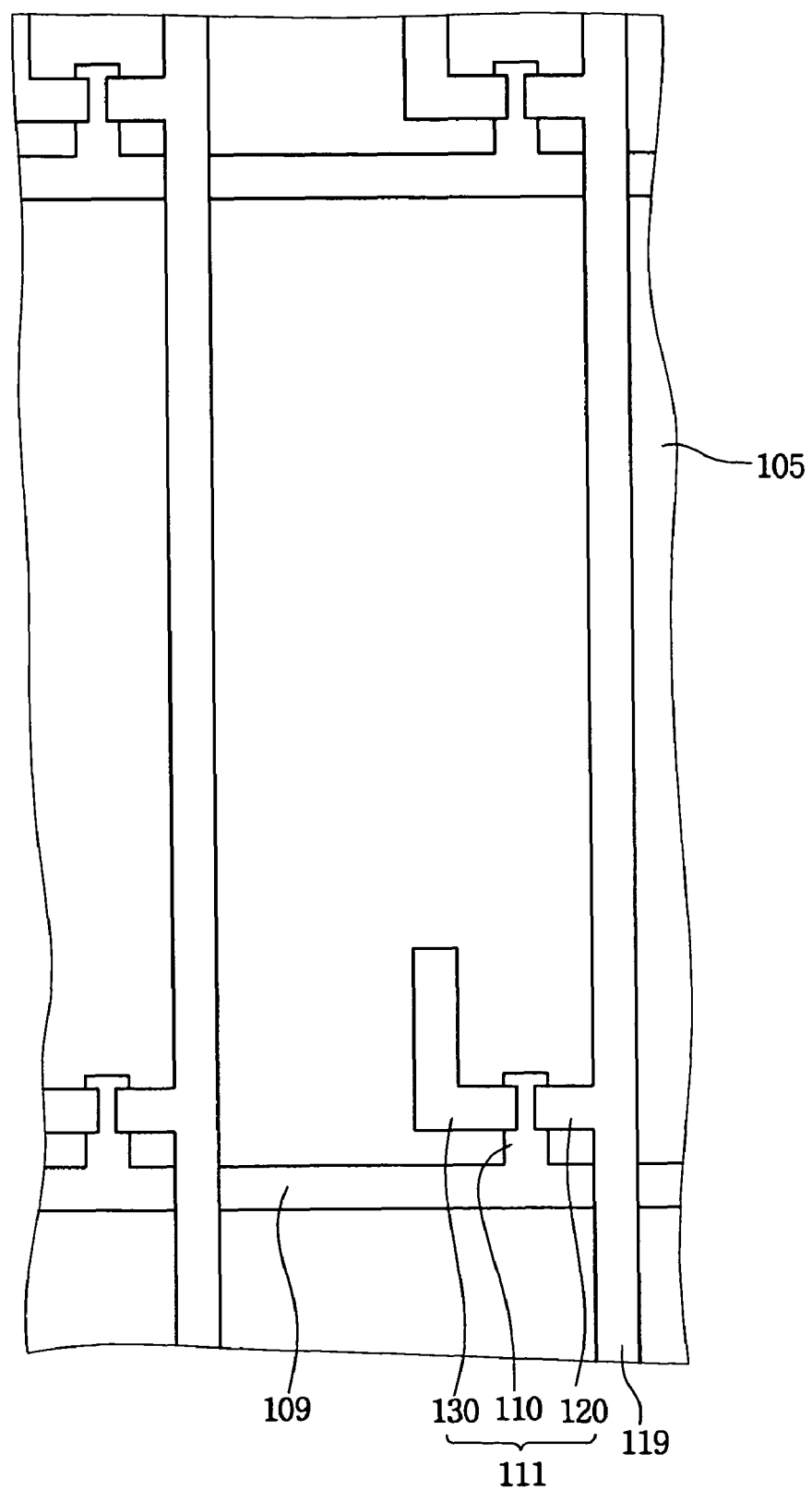
Figure 5C:
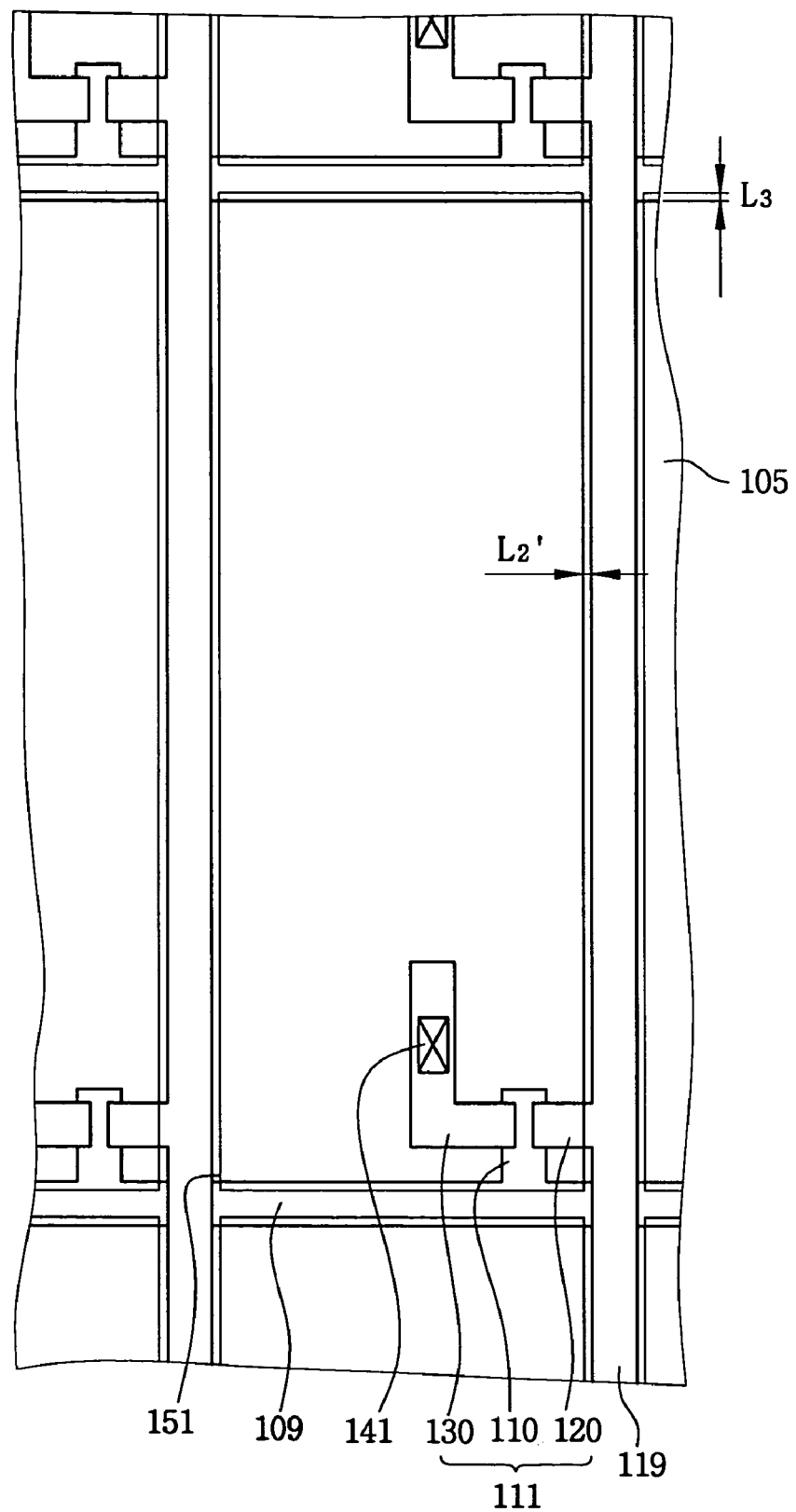

Referring to FIG. 5C, an ITO layer is formed on the pixel area defined by a gate line 109 and a source line 119 so as to form a pixel electrode 151. The pixel electrode 151 is electrically connected to a drain electrode 130 through a first contact hole 141. The pixel electrode 151 may be formed by forming the ITO layer on a source-drain insulating layer 140 and an organic insulating layer 144 and by patterning the ITO formed on the source-drain insulating layer 140 and the organic insulating layer 144, such that the patterned ITO remains only on the pixel area. Alternatively, the pixel electrode 151 may be formed by forming the ITO only on the pixel area. In this exemplary embodiment, the pixel electrode 151 is not overlapped with the source line 119.

Figure 5D:
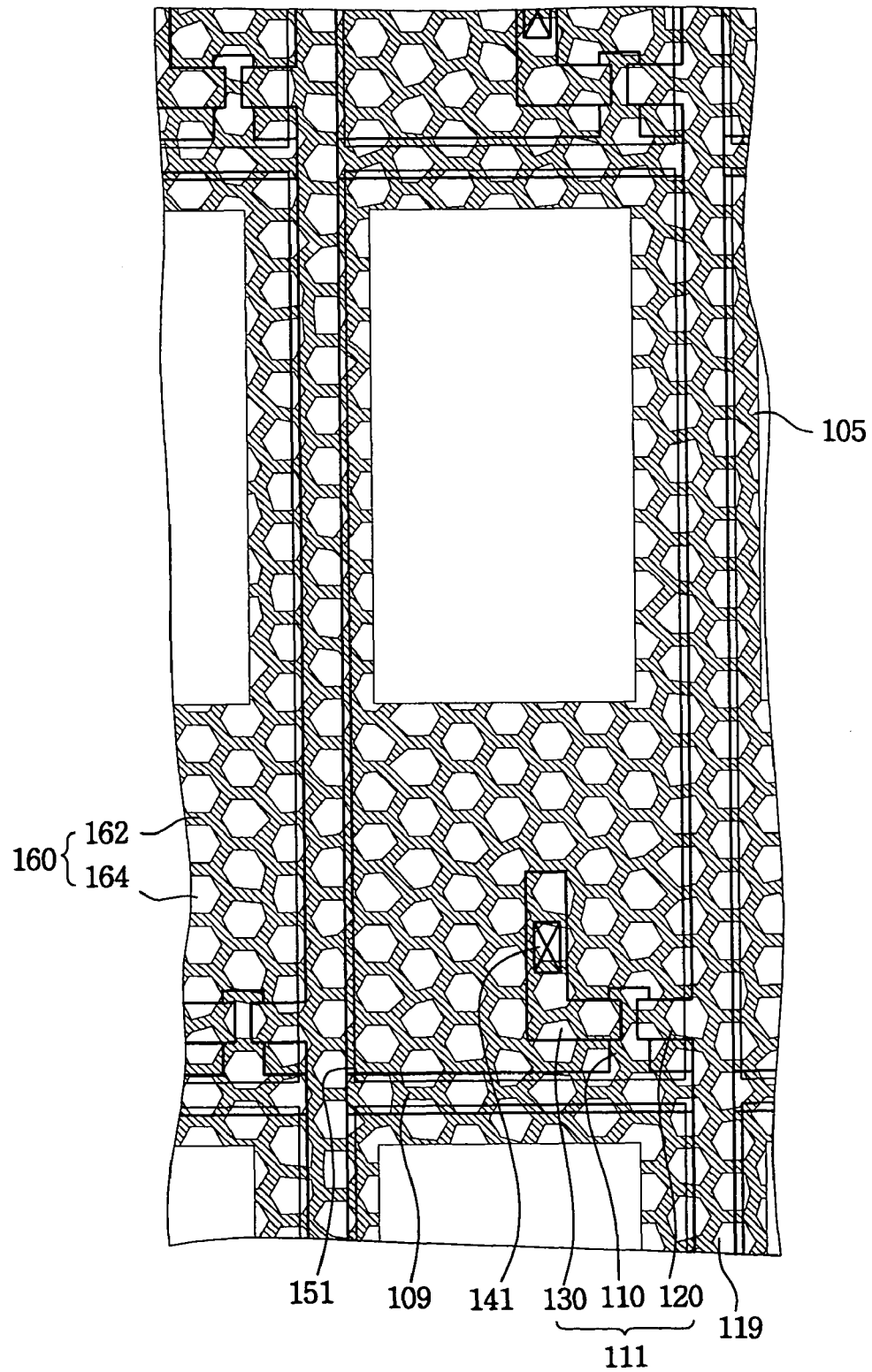

As shown in FIG. 5D, a reflecting plate 160 is formed on a position corresponding to the pixel area defined by the gate line 109 and the source line 119. The reflecting plate 160 includes a groove 162 and a protrusion 164 corresponding to a concavo-convex shape of the organic insulating layer 144 so as to enhance a reflection efficiency of a natural light NL. The reflecting plate 160 is formed on a position corresponding to a first area, and partially extended to the second area, thereby partially connecting the reflecting plate 160 to the pixel electrode 151.

Figure 6:
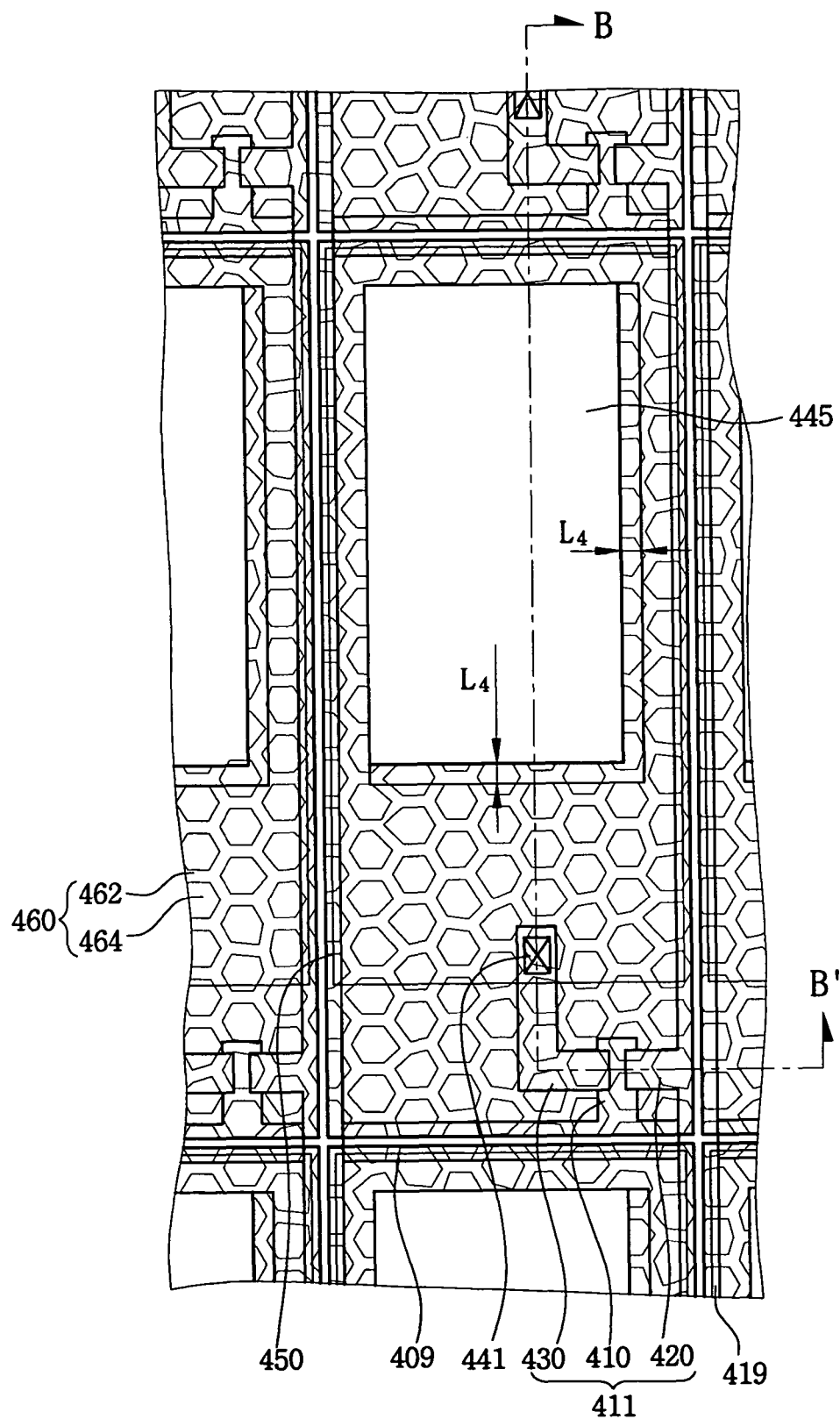
FIG. 6 is a plan view showing a reflective-transmissive type liquid crystal display apparatus according to another exemplary embodiment of the present invention.

FIG. 6 is a plan view showing a reflective-transmissive type liquid crystal display apparatus according to another exemplary embodiment of the present invention. In this exemplary embodiment, an array substrate for a reflective-transmissive type liquid crystal display apparatus having a structure of bottom-ITO will be described.

Referring to FIG. 6, an array substrate 400 (see FIG. 7) includes a transparent substrate 405 (see FIG. 7), a gate line 409 formed on the transparent substrate 405, extended in a first direction and arranged in a second direction substantially perpendicular to the first direction, a source line 419 disposed on the transparent substrate 405 (see FIG. 7), extended in the second direction and arranged in the first direction, a switching device TFT formed in an area defined by the gate and source lines 109 and 119, a pixel electrode 450 electrically connected to the drain electrode 430, and a reflecting page 460 formed on the pixel electrode 450.

The switching device TFT includes a gate electrode 410 extended from the gate line 409 and, a source electrode 420 extended from the source line 419 and a drain electrode 430 spaced apart from the source electrode 420.

Alternatively, the array substrate 400 may include a plurality of gate lines and a plurality of source lines.

The reflecting plate 460 includes an edge partially extended from the first area to the second area and connected to the pixel electrode 450.

In this exemplary embodiment, the reflecting plate 460 formed on the first area is partially extended to the transmissive window 145 in consideration of a rubbing direction of an alignment layer (not shown) formed on the array substrate 400, and connected to the pixel electrode 450 disposed thereunder. Particularly, when viewed the array substrate 400 at an upper position in FIG. 6, the reflecting plate 460 is connected to the pixel electrode 450 due to an extension of edge of the first area adjacent to bottom and right sides of the transmissive window 445 in case of rubbing the alignment layer in 10 o'clock.

Figure 7:
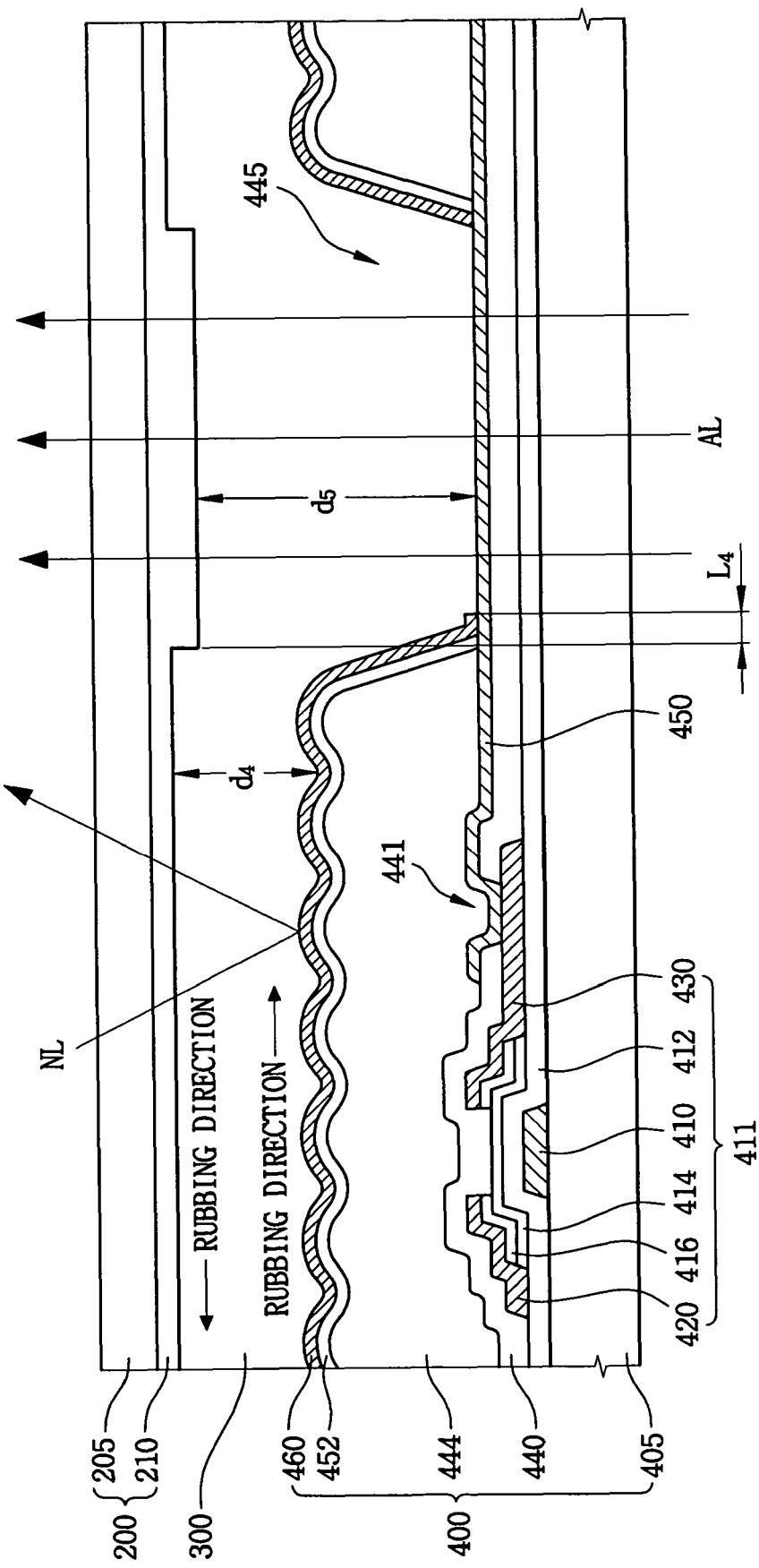
FIG. 7 is a cross-sectional view taken along the line B-B' of FIG. 6.

FIG. 7 is a cross-sectional view taken along the line B-B' of FIG. 6.

Referring to FIGS. 6 and 7, the reflective-transmissive type liquid crystal display (LCD) apparatus includes the array substrate 400, a color filter substrate 200 and a liquid crystal layer 300 disposed between the array substrate 400 and the color filter substrate 200.

The array substrate 100 includes the transparent substrate 405, the switching device 411 having the gate electrode 410 formed on the transparent substrate 405, a gate insulating layer 412 formed on the gate electrode 410 and the transparent substrate 405, a semiconductor layer 414, an ohmic contact layer 416, the source electrode 420 and the drain electrode 430, and a source-drain insulating layer 440 formed on the switching device 411 and the gate insulating layer 412. The source-drain insulating layer 440 is formed with a contact hole 441 so as to partially expose the drain electrode 430.

The array substrate 400 further includes the pixel electrode 450 formed on the source-drain insulating layer 440 and connected to the drain electrode 430 through the contact hole 441, an organic insulating layer 444 formed on the first area to cover the switching device 441, a protecting layer 452 formed on the organic insulating layer 444 and the reflecting plate 460 formed on the protecting layer 452. In order to enhance a reflection efficiency of the natural light NL, a groove 462 and a protrusion 464 are formed on an upper surface of the organic insulating layer 444.

Especially, since the pixel electrode 450 is formed on an area except an area on which the switching device 411 is formed, a voltage signal may not be normally applied to a portion of the liquid crystal layer 300, which is adjacent to the switching device 411.

In this exemplary embodiment shown in FIGS. 6 and 7, the color filter substrate 200 has same function and structure as those of the color filter substrate shown in FIG. 2, and thus the detailed descriptions of the color filter substrate in FIG. 7 will be omitted.

The liquid crystal layer 300 disposed between the array substrate 400 and the color filter substrate 200 transmits the natural light NL passing through the color filter substrate 200 or transmits the artificial light AL passing through a transmission window 445 in response to a voltage signal applied to the array substrate 100 and a voltage signal applied to the color filter substrate 200. The liquid crystal layer 300 has a different cell gap at each of a first area corresponding to the first area and a second area corresponding to the second area. When the cell gap of the liquid crystal layer 300 corresponding to the first area and the cell gap of the liquid crystal layer 300 corresponding to the second area are represented by d4 and d5, respectively, a thickness of the liquid crystal layer 300 satisfies a condition of d4<d5.

Especially, the cell gap concerning the first area and the second area depends upon the liquid crystal molecules of the liquid crystal layer 300 and an optical film disposed on and under the liquid crystal layer 300. In general, the cell gap d4 corresponding to the first area is less than about 1.7 μm, and the cell gap d5 corresponding to the second area is less than about 3.3 μm.

Since the liquid crystal layer 300 is treated by homogeneous alignment treatment, the liquid crystal layer 300 additionally includes the liquid crystal molecules having a twisted angle of zero. In order to allow the liquid crystal molecules to have the twisted angle of zero, an alignment layer (not shown) formed on the array substrate 400 is rubbed in the first direction, and an alignment layer (not shown) formed on the color filter substrate 200 is rubbed in the second direction. The first and second directions are opposite to each other.

A method for applying the voltage to both sides of the liquid crystal layer 300 after forming a common electrode layer (not shown) on the array substrate 400 and on the color filter substrate 200 has been described. However, in case that the common electrode layer (not shown) is not formed on the color filter substrate 200, the reflective-transmissive type LCD apparatus may reflect the natural light NL and transmit the artificial light AL by applying various voltages having different voltage levels from each other onto one surface of the array substrate 400.

Figure 8:
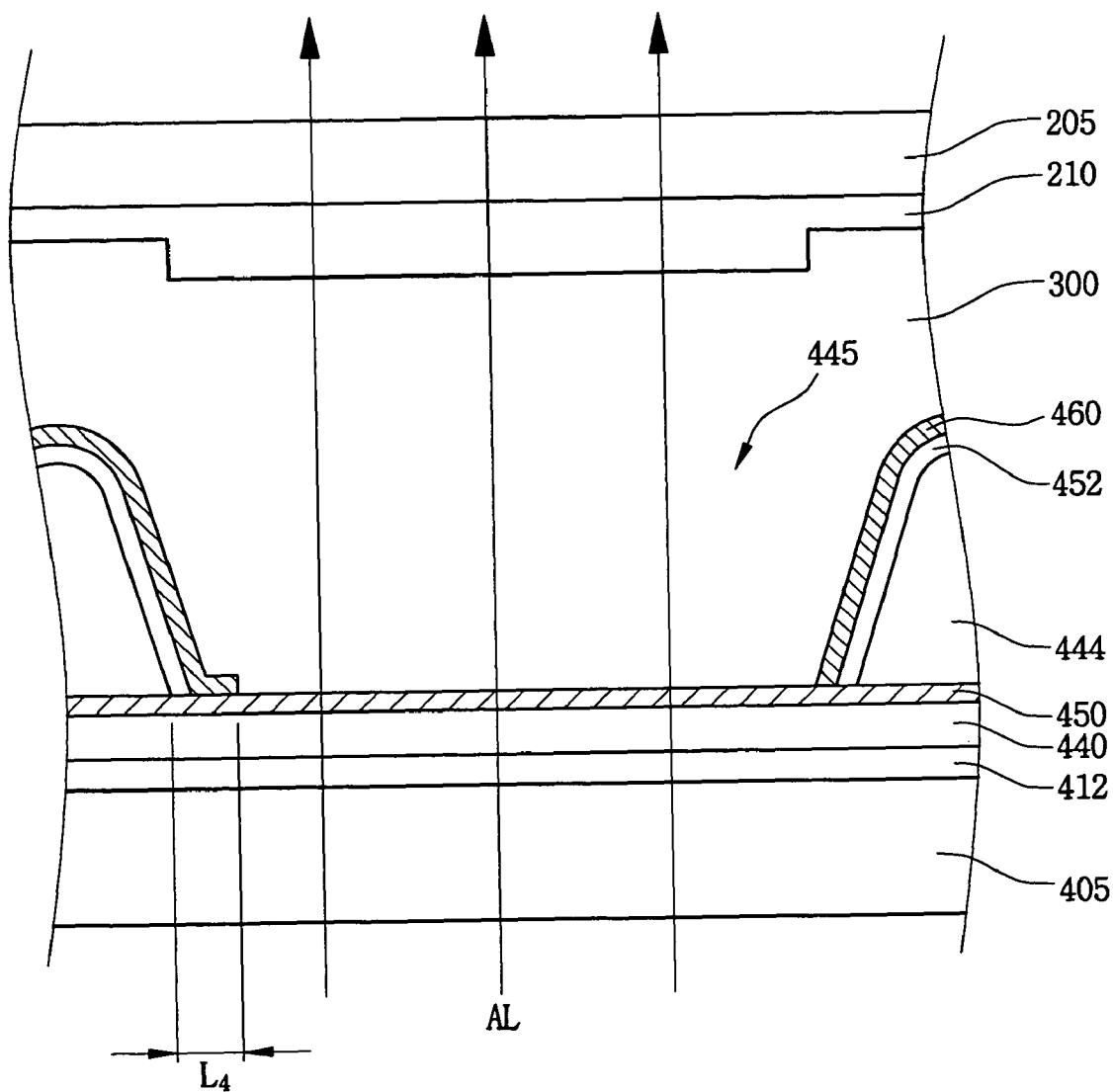
FIG. 8 is an enlarged view showing a boundary area between the first area and the second area of the reflective-transmissive type LCD apparatus shown in FIG. 7.

FIG. 8 is an enlarged view showing a boundary area between the first area and the second area of the reflective-transmissive type LCD apparatus shown in FIG. 7.

Referring to FIGS. 7 and 8, the reflecting plate 460 formed on the organic insulating layer 444 is partially extended to the transmission window 445 and electrically connected to the pixel electrode 450.

That is, in order to electrically connect the reflecting plate 460 to the pixel electrode 450, a portion of the edge of the reflecting plate 460, which is adjacent to the transmission window 445, is extended to the transmission window 445 according to the rubbing direction for the liquid crystal layer 300. Thus, loss of the natural light NL and the artificial light AL due to a transmittance and a reflectance of the reflective-transmissive type LCD apparatus may be reduced. Further, the reflective-transmissive type LCD apparatus may prevent occurrence of the afterimage and leakage of the light caused by a difference of the cell gap between the first area and the second area thereof.

FIGS. 9A to 9D are views illustrating a method of manufacturing the reflective-transmissive type LCD apparatus shown in FIG. 6. Particularly, in FIGS. 9A to 9D, a method of manufacturing the array substrate 400 shown in FIG. 6 will be described. In FIGS. 9A to 9D, the same reference numerals denote the same elements in FIG. 6, and thus the detailed descriptions of the same elements will be omitted.

Figure 9A:
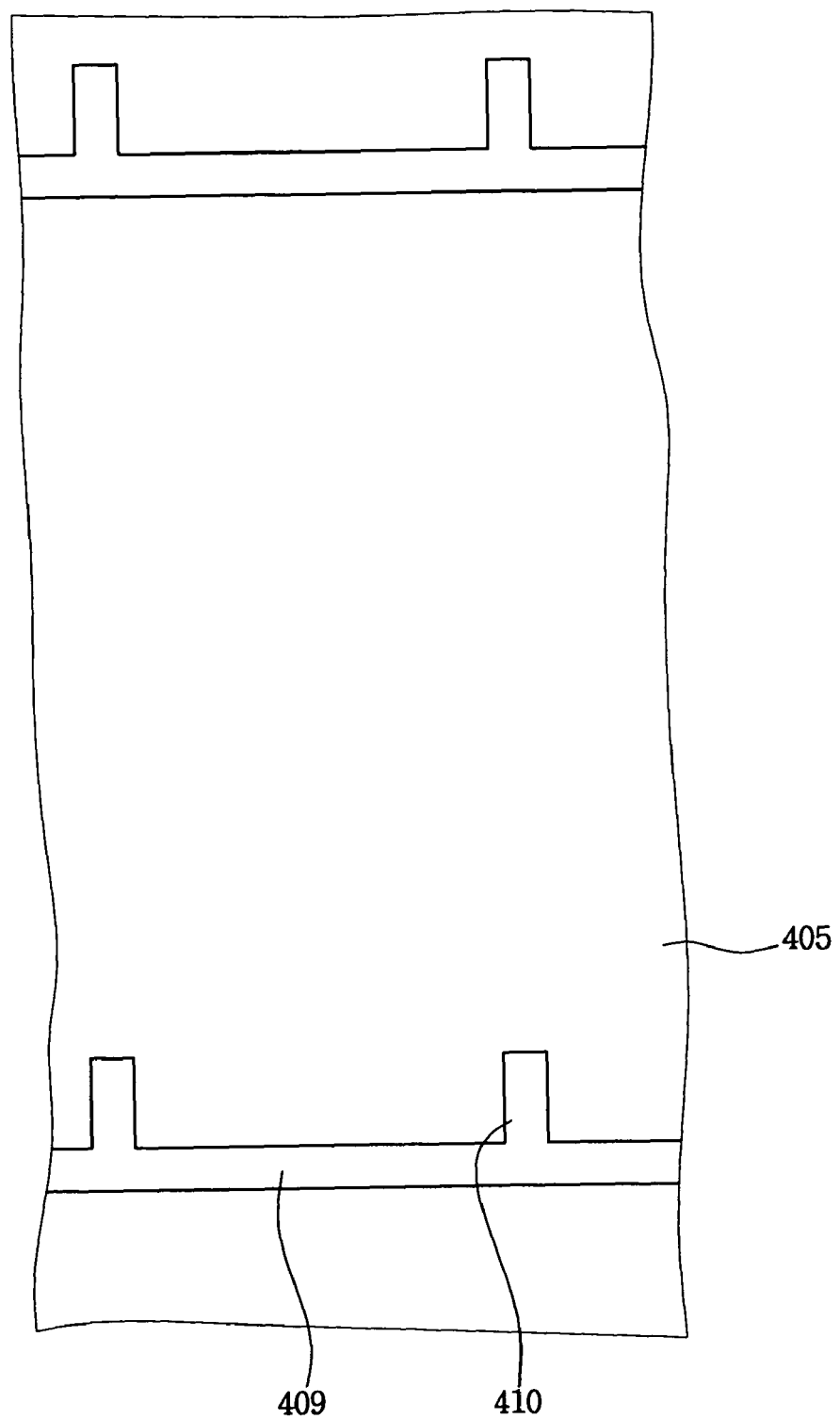
FIGS. 9A to 9D are views illustrating a method of manufacturing the reflective-transmissive type LCD apparatus shown in FIG. 6.

Referring to FIG. 9A, a metal layer comprising a metal material, for example, such as tantalum (Ta), titanium (Ti), molybdenum (Mo), aluminum (Al), chromium (Cr), copper (Cu), tungsten (W), etc., is formed on the transparent substrate 405 comprising an insulating material, for example, such as glass, ceramic and so on. The gate line 409 extended in the horizontal direction and successively arranged in the vertical direction, and the gate electrode 410 extended from the gate line 409 are then formed when the metal layer is patterned.

Although not shown in FIG. 9A, a storage electrode line (not shown) is also formed when the gate electrode 410 is formed. In order to form the gate insulating layer 412, silicon nitride is deposited over the transparent substrate 405 using a plasma-enhanced chemical vapor deposition method. Subsequently, an amorphous silicon layer and an $n^+$ amorphous silicon layer are successively formed on the gate insulating layer 412, and patterned to form the semiconductor layer 414 and the ohmic contact layer 416.

Figure 9B:
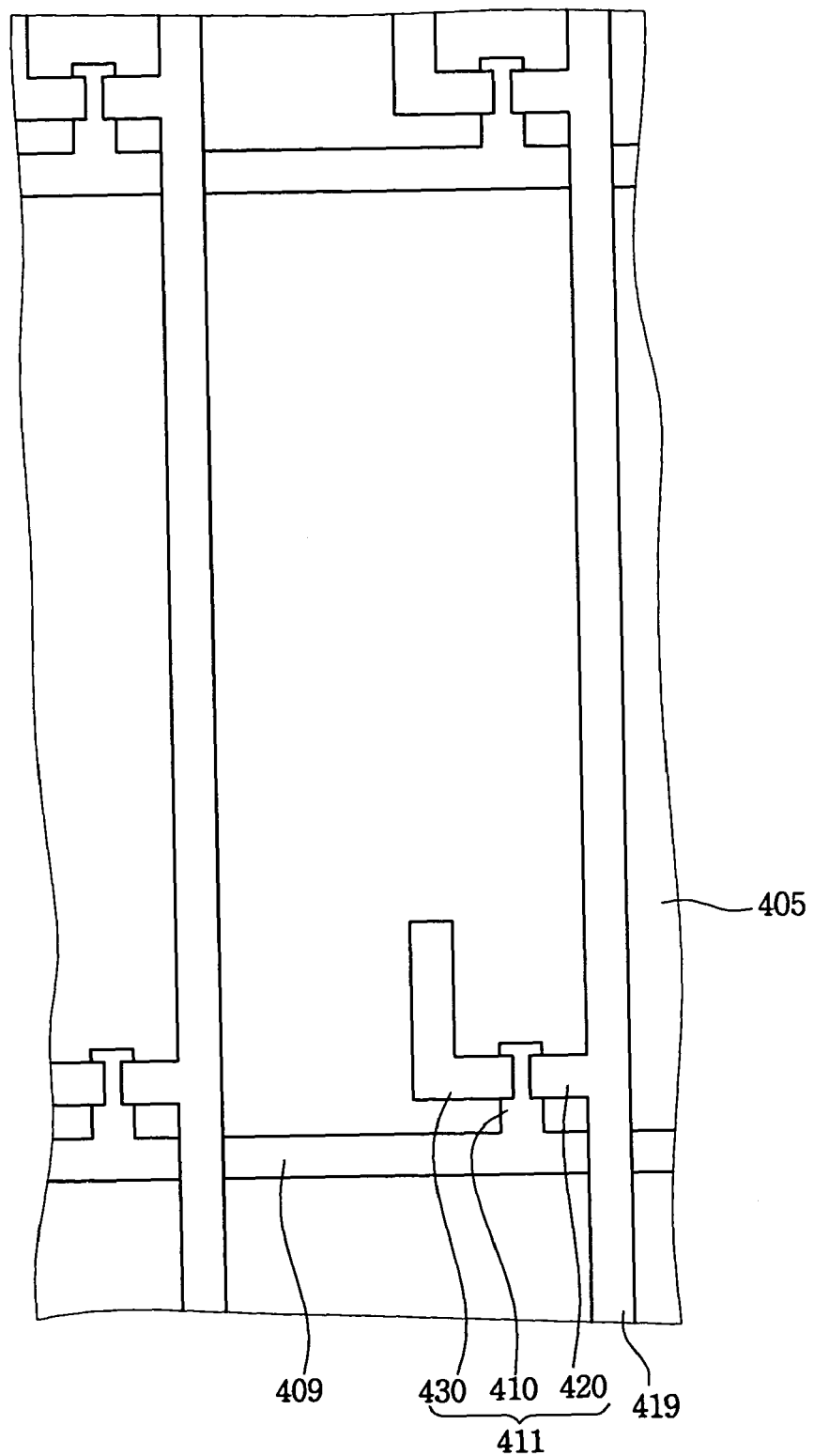

As shown in FIG. 9B, a metal layer having a metal material, for example, such as tantalum (Ta), titanium (Ti), molybdenum (Mo), aluminum (Al), chromium (Cr), copper (Cu), tungsten (W), etc., is formed on the transparent substrate 405 on which the resultant structure shown in FIG. 9A is formed. When the metal layer is patterned, the source line 419 extended in the vertical direction and successively arranged in the horizontal direction, the source electrode 420 extended from the source line 419 and the drain electrode 430 spaced apart from the source electrode 420 are then formed.

Figure 9C:
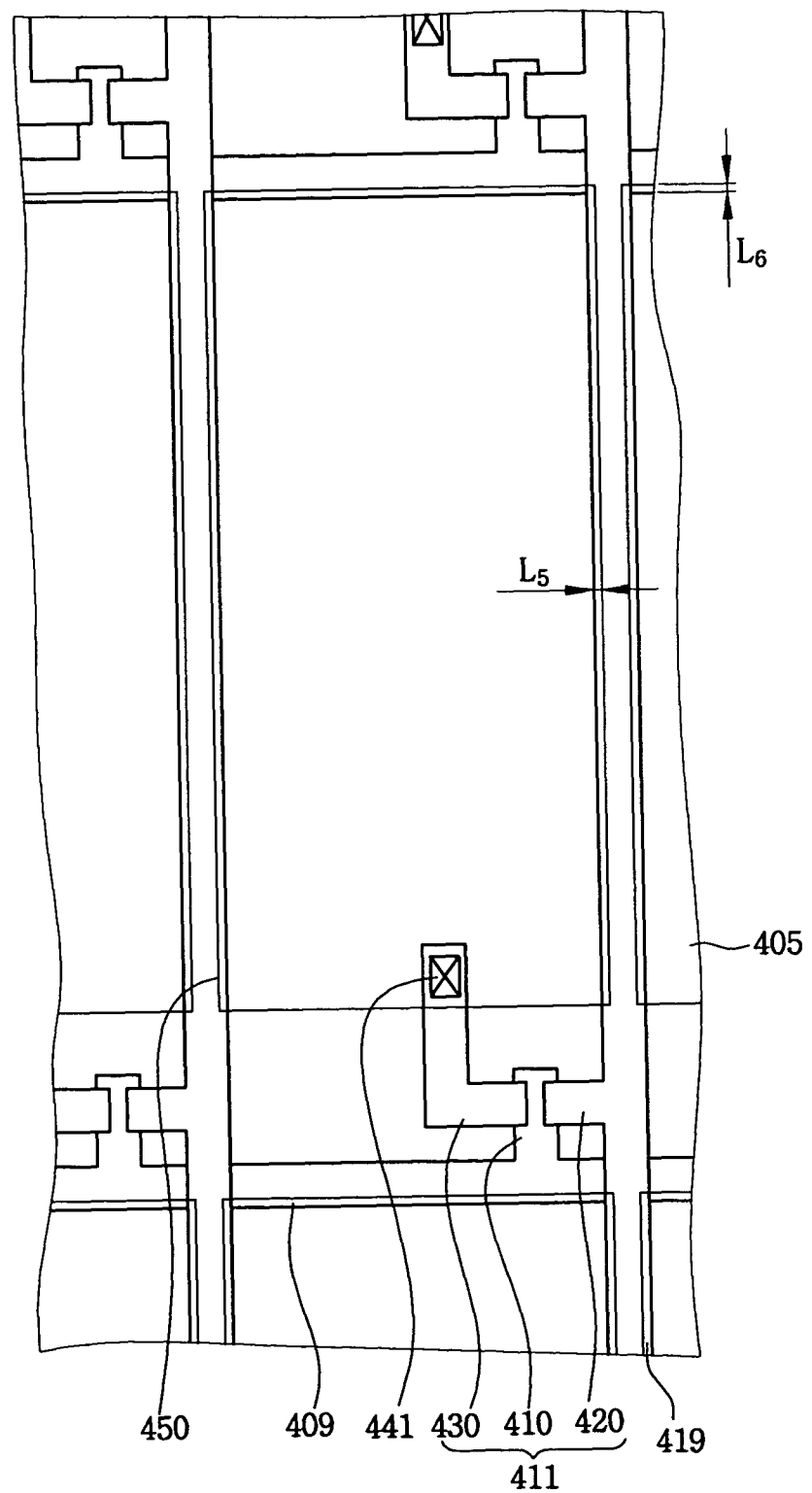

Referring to FIG. 9C, the source-drain insulating layer 440 is formed on the resultant structure of the transparent substrate 405 shown in FIG. 9B. Here, the source-drain insulating layer 440 is patterned so as to partially expose the drain electrode 430.

An ITO layer is formed on the pixel area defined by the gate line 409 and the source line 419 so as to form the pixel electrode 450. The pixel electrode 450 is electrically connected to the drain electrode 430 through the contact hole 441. The pixel electrode 450 may be formed by forming the ITO layer over the source-drain insulating layer 440 and by patterning the ITO formed on the source-drain insulating layer 440, such that the patterned ITO remains only on the pixel area. Alternatively, the pixel electrode 450 may be formed by forming the ITO only on the pixel area. As shown in FIG. 9C, when a distance L5 where the pixel electrode 450 and the source line 419 are overlapped with each other and a distance L6 where the pixel electrode 450 and the gate line 409 are overlapped with each other become smaller, an opening ratio of a second area may be enhanced. The gate line 409 overlapped with the pixel electrode 450 acts as a gate line of a previous stage.

Figure 9D:
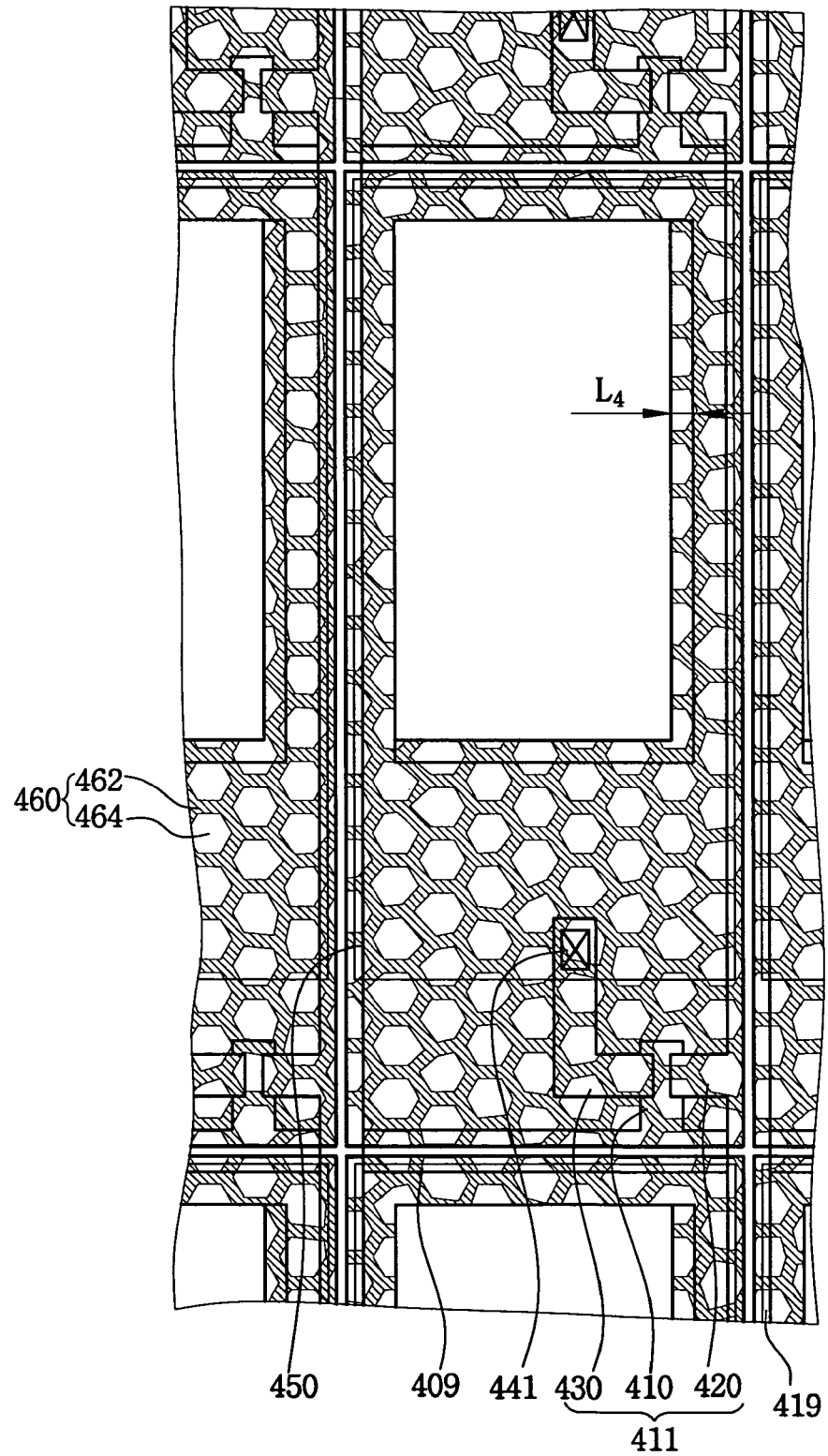

Referring to FIG. 9D, the organic insulating layer 444 is formed on the transparent substrate 405 shown in FIG. 9C. The organic insulating layer 444 is partially patterned to form the transmission window 445, and the protecting layer 452 and the reflecting plate 460 are successively formed on the organic insulating layer 444. In order to enhance the reflection efficiency of the natural light NL incident into the reflecting plate 460, an upper surface of the organic insulating layer 444 has a concavo-convex shape. The reflecting plate 460 also includes a groove 462 and a protrusion 464 corresponding to the concavo-convex shape of the organic insulating layer 444 so as to enhance the reflection efficiency of the natural light NL.

As described above, in the reflective-transmissive type LCD apparatus having the bottom-ITO structure, the reflecting plate 460 is extended to the second area, and connected to the pixel electrode 450. Thus, when viewed the array substrate 400 at an upper position thereof, an extension area of the reflecting plate 460 to the second area has a reversed L-shape in case of rubbing the alignment layer in 10 o'clock, thereby preventing occurrence of afterimage and leakage of light of the reflective-transmissive type LCD apparatus having a non-uniform cell gap.

The reflective-transmissive type LCD apparatus having the bottom-ITO structure may further enhance the reflection efficiency because the reflective-transmissive type LCD apparatus having the bottom-ITO structure does not need to form the contact hole through which the drain electrode 430 of the switching device 411 is exposed.

Figure 10:
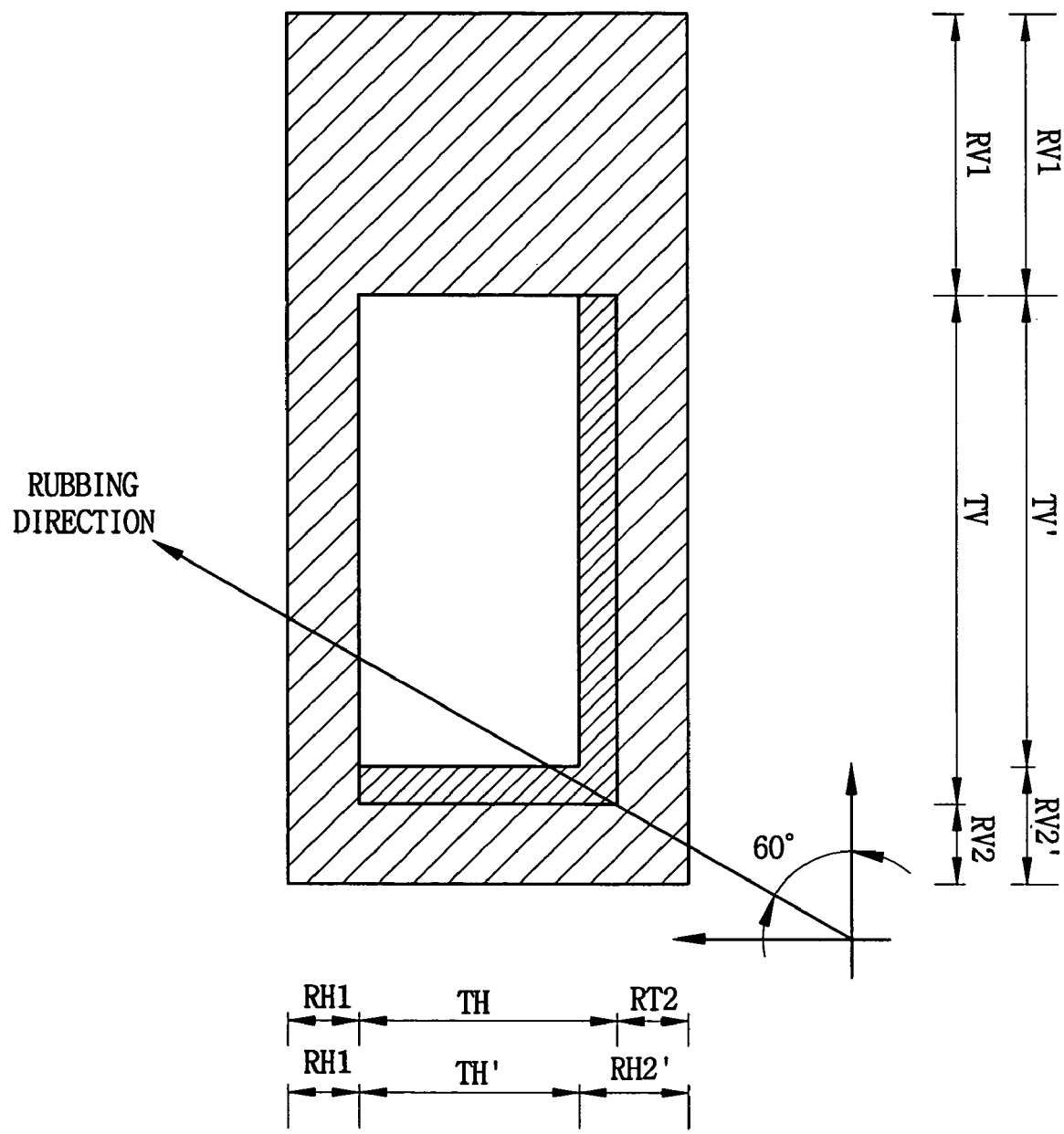
FIG. 10 is a plan view showing a reflecting plate partially overlapped with a second area of a reflective-transmissive type LCD apparatus according to an exemplary embodiment of the present invention.

FIG. 10 is a plan view showing a reflecting plate partially overlapped with a second area of a reflective-transmissive type LCD apparatus according to an exemplary embodiment of the present invention. In this exemplary embodiment, a reflecting plate considering occurrence of afterimage and leakage of light when an alignment layer of an array substrate is rubbed in a direction of 10 o'clock will be described.

Referring to FIG. 10, in each of pixel areas, a reflecting plate is partially opened. The opened area acts as the second area, and has generally a rectangular shape. In this exemplary embodiment, since the alignment layer of the array substrate is rubbed in a direction of 10 o'clock, a lower edge of the reflecting plate corresponding to a lower portion of the transmission window is extended by RV2'-RV2, so that the lower edge of the reflecting plate is overlapped with the lower portion of the transmission window. A right edge of the reflecting plate corresponding to a right portion of the transmission window is extended by RH2'-RT2, so that the right edge of the reflecting plate is overlapped with the right portion of the transmission window. When the reflective-transmissive type LCD apparatus to which the reflecting plate is applied has a top-ITO, the extended lower and right edges of the reflecting plate may be insulated from the pixel electrode disposed thereunder. When the reflective-transmissive type LCD apparatus to which the reflecting plate is applied has a bottom-ITO, the extended lower and right edges of the reflecting plate must be connected to the pixel electrode disposed thereunder.

As described above, since the lower and right edges of the reflecting plate corresponding to the lower and right portions of the transmission window are extended to the transmission window, the reflective-transmissive type LCD apparatus may prevent occurrence of disclination and leakage of light. The reflective-transmissive type LCD apparatus may further prevent lowering of transmittance because the second area when only the lower and right edges of the reflecting plate are extended to the transmission window is greater than the second area when all edges of the first area are extended to the transmission window.

In FIG. 10, the lower and right edges of the reflecting plate may be partially extended to the transmission window.

Figure 11:
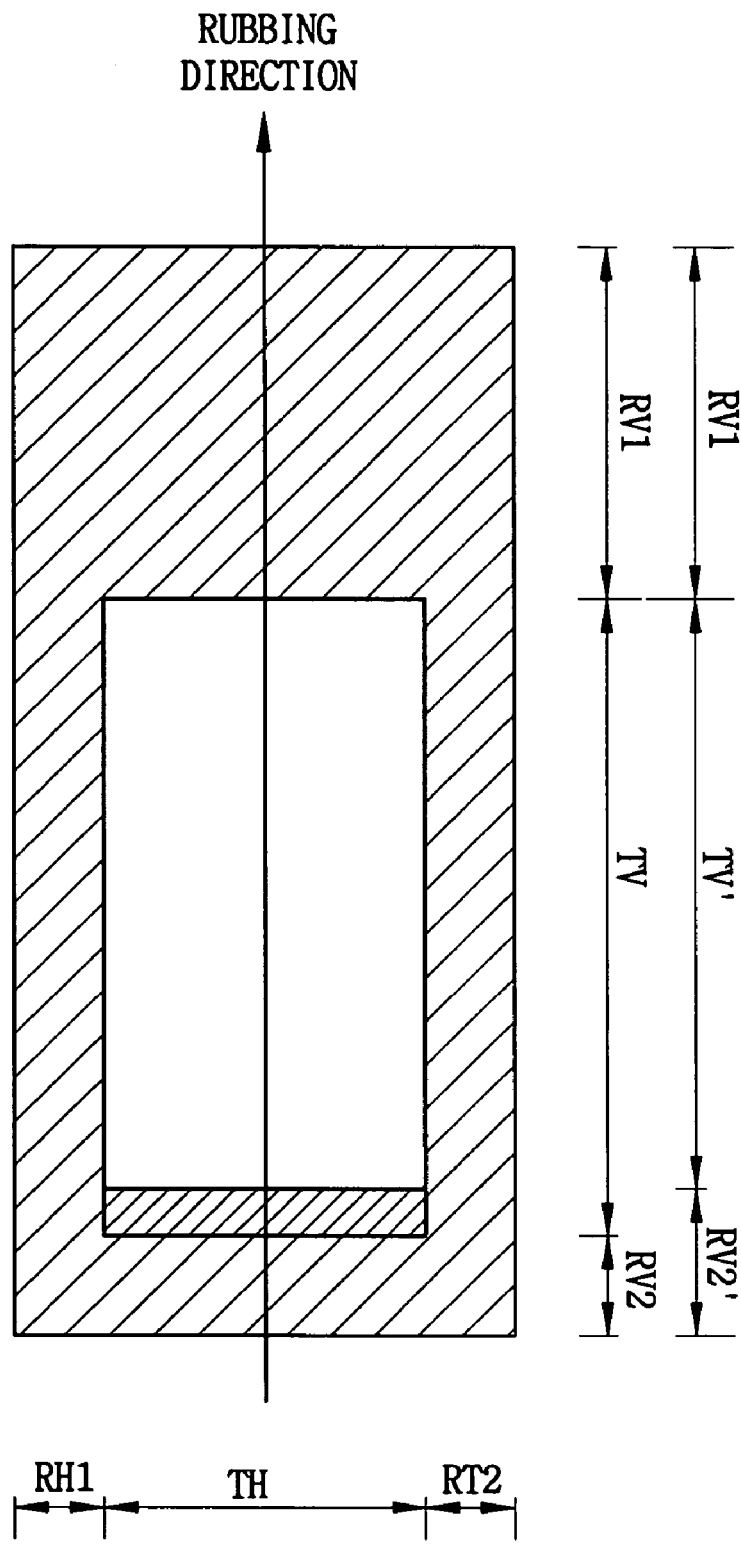
FIG. 11 is a plan view showing a reflecting plate partially overlapped with a second area of a reflective-transmissive type LCD apparatus according to another exemplary embodiment of the present invention.

FIG. 11 is a plan view showing a reflecting plate partially overlapped with a second area of a reflective-transmissive type LCD apparatus according to another exemplary embodiment of the present invention. In this exemplary embodiment, a reflecting plate when an alignment layer of an array substrate is rubbed in a direction of 12 o'clock will be described.

Referring to FIG. 11, in each of pixel areas, a reflecting plate is partially opened. The opened area acts as the second area, and has generally a rectangular shape. In this exemplary embodiment, since the alignment layer of the array substrate is rubbed in a direction of 12 o'clock, a lower edge of the reflecting plate corresponding to a lower portion of the transmission window is extended by RV2'-RV2, so that the lower edge of the reflecting plate is overlapped with the lower portion of the transmission window.

When the reflective-transmissive type LCD apparatus to which the reflecting plate is applied has a top-ITO, the extended lower and right edges of the reflecting plate may be insulated from the pixel electrode disposed thereunder. When the reflective-transmissive type LCD apparatus to which the reflecting plate is applied has a bottom-ITO, the extended lower and right edges of the reflecting plate must be connected to the pixel electrode disposed thereunder.

As described above, since the lower edge of the reflecting plate corresponding to the lower portion of the transmission window is extended to the transmission window, the reflective-transmissive type LCD apparatus may prevent occurrence of disclination and leakage of light.

The reflective-transmissive type LCD apparatus may further prevent lowering of transmittance because the second area when only the lower edge of the reflecting plate is extended to the transmission window is greater than the second area when all edges of the first area are extended to the transmission window.

In FIG. 11, the lower edge of the reflecting plate may be partially extended to the transmission window.

Figure 12:
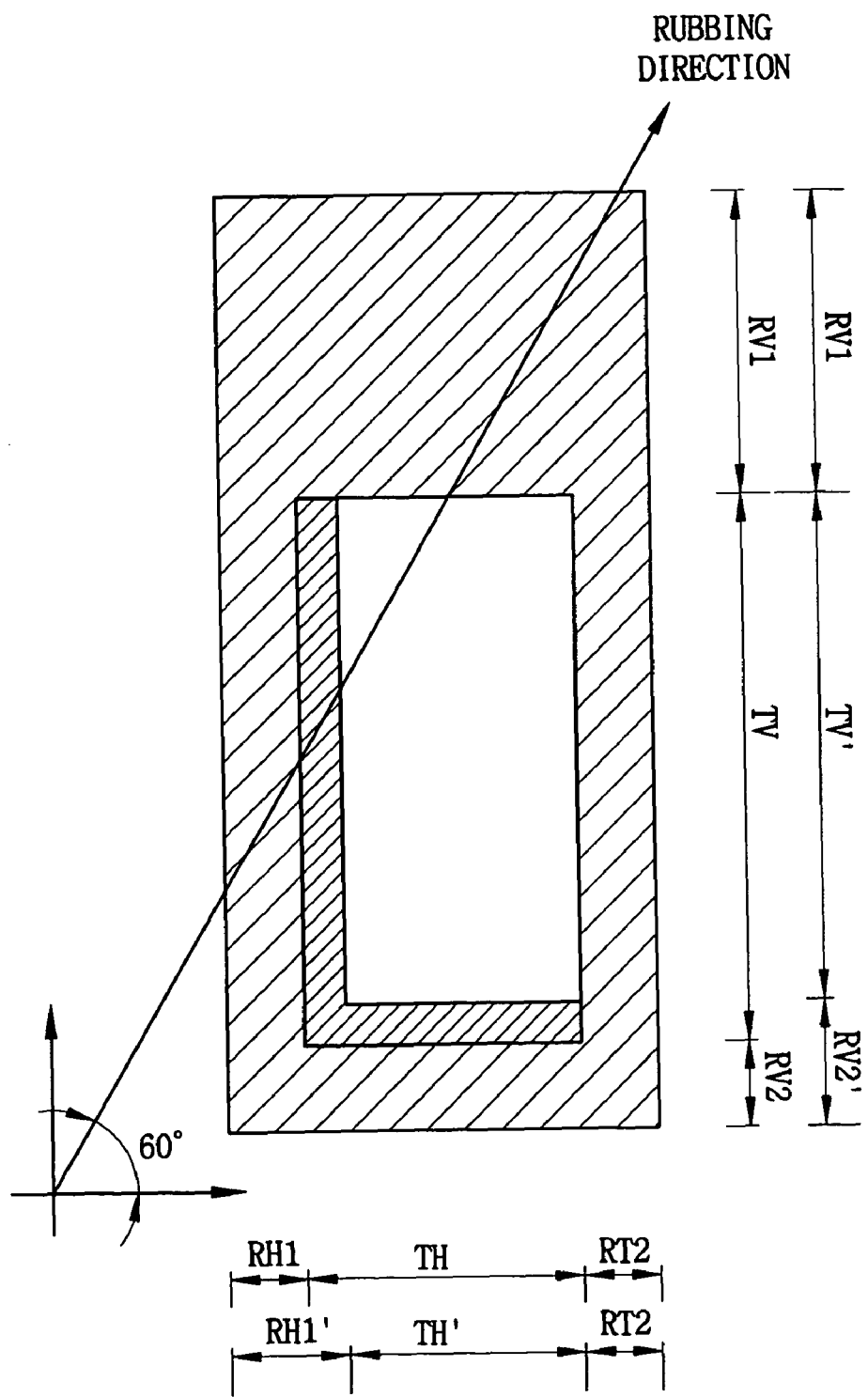
FIG. 12 is a plan view showing a reflecting plate partially overlapped with a second area of a reflective-transmissive type LCD apparatus according to another exemplary embodiment of the present invention.

FIG. 12 is a plan view showing a reflecting plate partially overlapped with a second area of a reflective-transmissive type LCD apparatus according to another exemplary embodiment of the present invention. In this exemplary embodiment, a reflecting plate considering occurrence of afterimage and leakage of light when an alignment layer of an array substrate is rubbed in a direction of 1 o'clock will be described.

Referring to FIG. 12, in each of pixel areas, a reflecting plate is partially opened. The opened area acts as the second area, and has generally a rectangular shape. In this exemplary embodiment, since the alignment layer of the array substrate is rubbed in a direction of 1 o'clock, a lower edge of the reflecting plate corresponding to a lower portion of the transmission window is extended by RV2'-RV2, so that the lower edge of the reflecting plate is overlapped with the lower portion of the transmission window. A left edge of the reflecting plate corresponding to a left portion of the transmission window is extended by RH1'-RH1, so that the left edge of the reflecting plate is overlapped with the left portion of the transmission window.

When the reflective-transmissive type LCD apparatus to which the reflecting plate is applied has a top-ITO, the extended lower and left edges of the reflecting plate may be insulated from the pixel electrode disposed thereunder. Whereas, when the reflective-transmissive type LCD apparatus to which the reflecting plate is applied has a bottom-ITO, the extended lower and left edges of the reflecting plate must be connected to the pixel electrode disposed thereunder.

As described above, since the lower and left edges of the reflecting plate corresponding to the lower and left portions of the transmission window are extended to the transmission window, the reflective-transmissive type LCD apparatus may prevent occurrence of disclination and leakage of light.

The reflective-transmissive type LCD apparatus may further prevent lowering of transmittance because the second area when only the lower and left edges of the reflecting plate are extended to the transmission window is greater than the second area when all edges of the first area are extended to the transmission window.

In FIG. 12, the lower and left edges of the reflecting plate may be partially extended to the transmission window.

Figure 13:
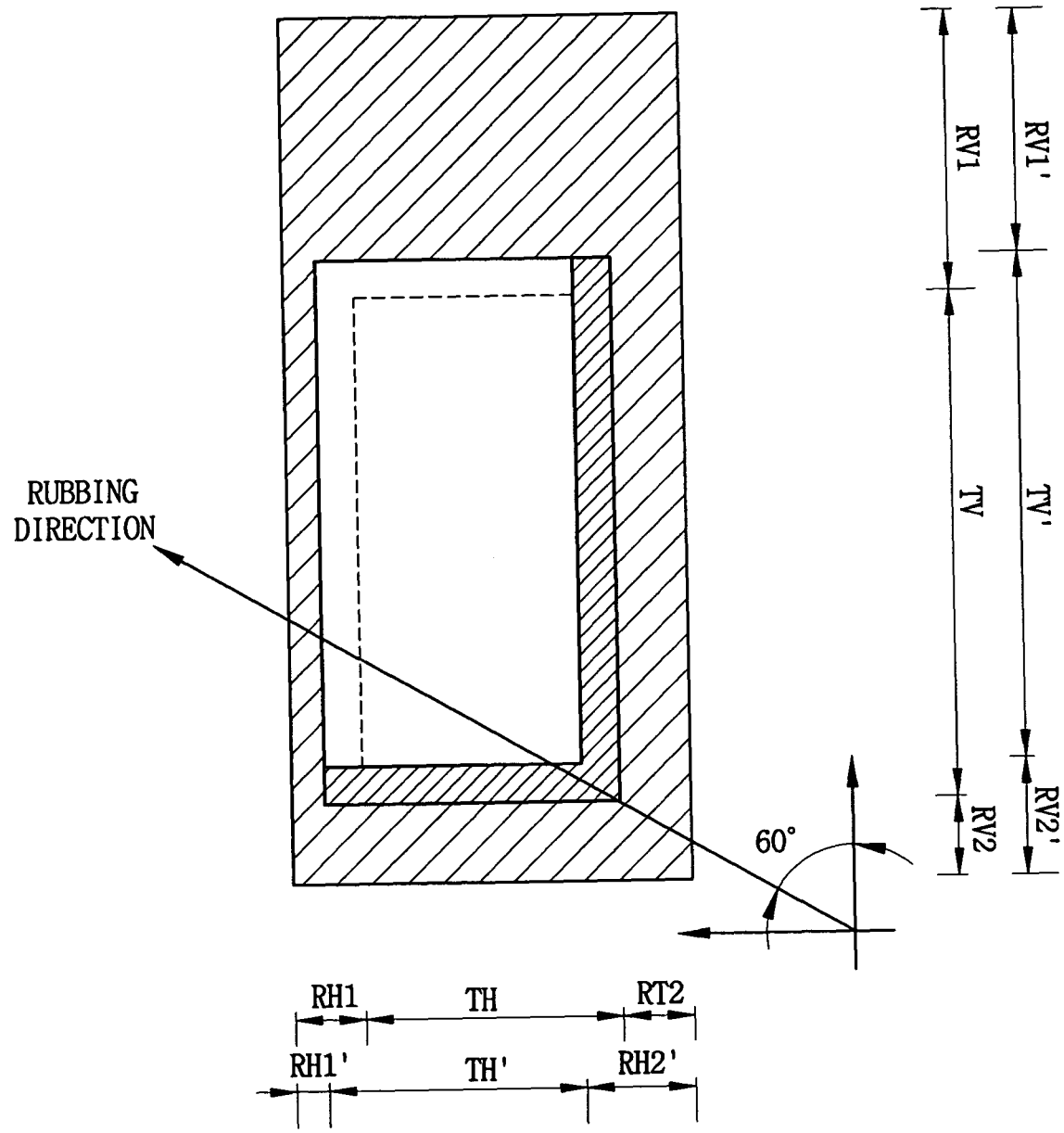
FIG. 13 is a plan view showing a reflecting plate partially overlapped with a second area of a reflective-transmissive type LCD apparatus according to another exemplary embodiment of the present invention.

FIG. 13 is a plan view showing a reflecting plate partially overlapped with a second area of a reflective-transmissive type LCD apparatus according to another exemplary embodiment of the present invention.

Referring to FIG. 13, in each of pixel areas, a reflecting plate is partially opened. The opened area acts as the transmitting area, and generally has a rectangular shape. In this exemplary embodiment, when the alignment layer of the array substrate is rubbed in a direction of 10 o'clock, a lower edge of the reflecting plate corresponding to a lower portion of the transmission window is extended by RV2'-RV2, so that the lower edge of the reflecting plate is overlapped with the lower portion of the transmission window. A right edge of the reflecting plate corresponding to a right portion of the transmission window is extended by RH2'-RT2, so that the right edge of the reflecting plate is overlapped with the left portion of the transmission window. A left edge of the reflecting plate corresponding to a left portion of the transmission window is also opened by RH1-RH1', and an upper edge of the reflecting plate corresponding to an upper portion of the transmission window is opened by RV1-RV1'.

In this exemplary embodiment, when the reflective-transmissive type LCD apparatus to which the reflecting plate is applied has a top-ITO structure, the extended lower and right edges of the reflecting plate may be insulated from the pixel electrode disposed thereunder. However, when the reflective-transmissive type LCD apparatus to which the reflecting plate is applied has a bottom-ITO, the extended lower and right edges of the reflecting plate must be connected to the pixel electrode disposed thereunder.

As described above, since the lower and right edges of the reflecting plate corresponding to the lower and right portions of the transmission window are extended to the transmission window and the upper and left edges of the reflecting plate corresponding to the upper and left portions of the transmission window are opened, the reflective-transmissive type LCD apparatus may prevent occurrence of disclination and leakage of light.

The reflective-transmissive type LCD apparatus may prevent lowering of transmittance because the second area when the lower and right edges of the reflecting plate are extended to the transmission window and the upper and left edges of the reflecting plate are opened is greater than the second area when all edges of the first area are extended to the transmission window.

In FIG. 13, the lower and right edges of the reflecting plate may be partially extended to the transmission window.

According to an analyzed result of the afterimage with respect to each of viewing angles, the disclination that affects the afterimage has been partially viewed at 11 o'clock, 12 o'clock, 1 o'clock and 2 o'clock directions except at 10 o'clock direction.

Figure 14A:
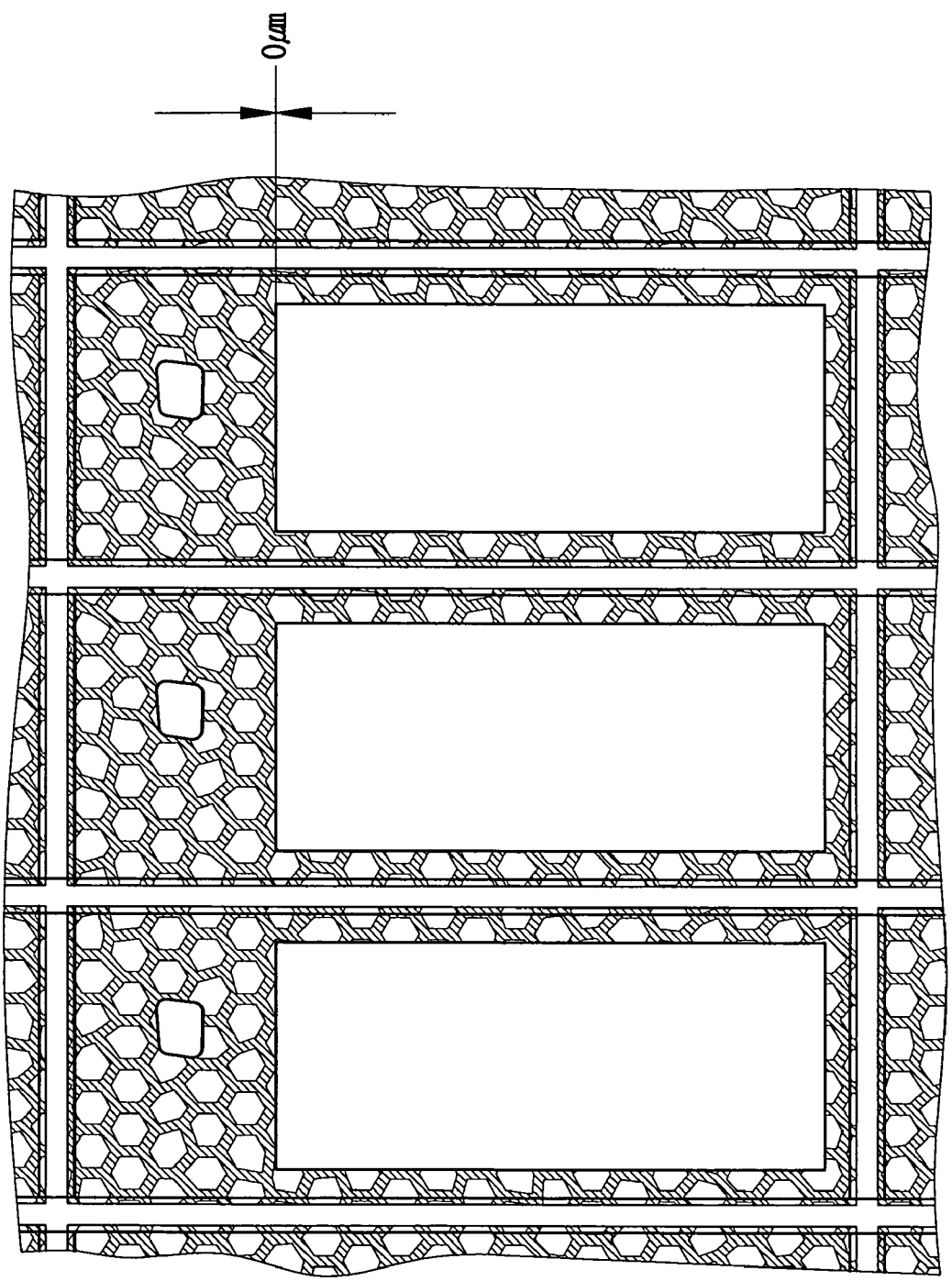
Figure 14C:
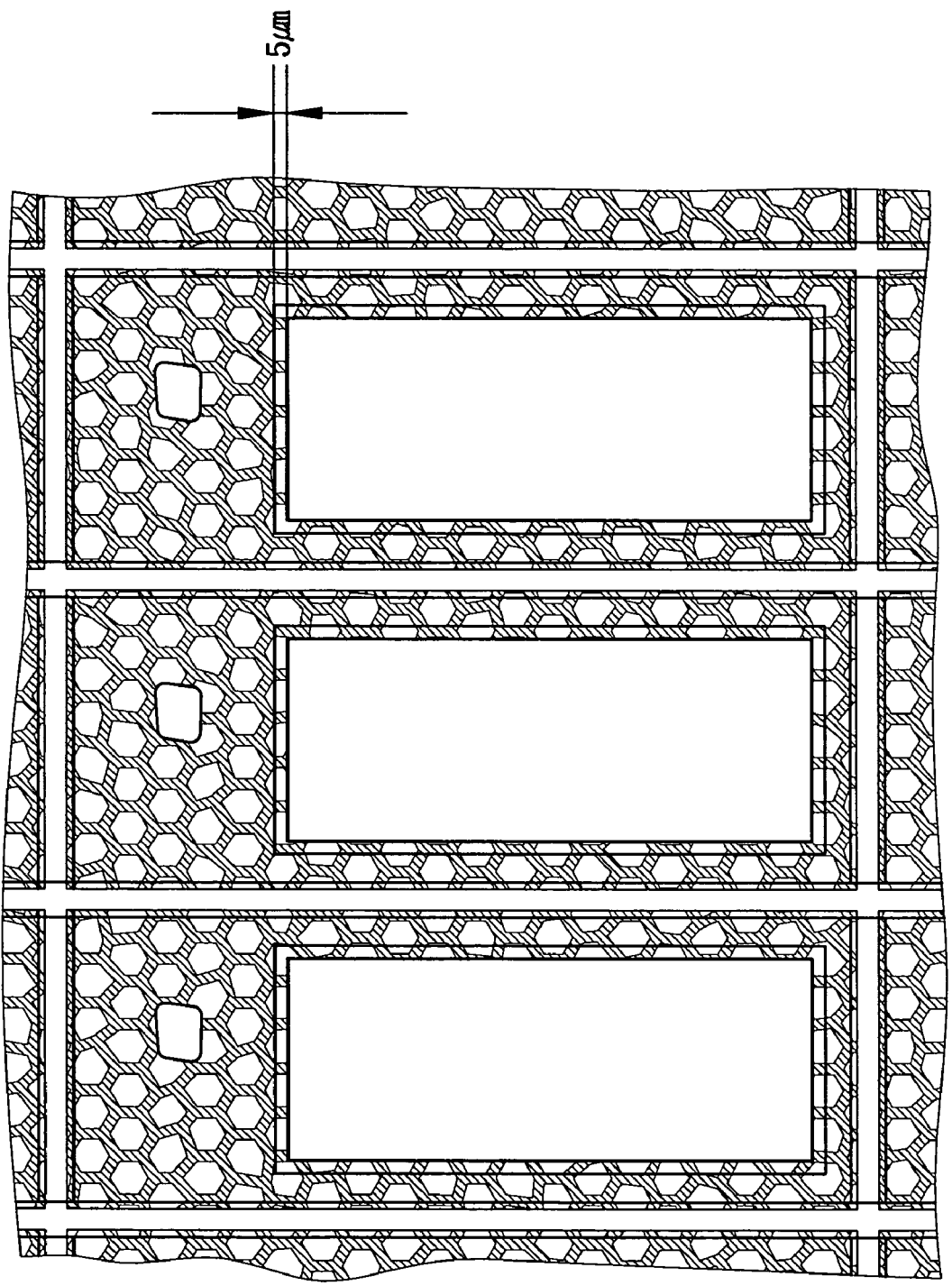
Figure 14D:
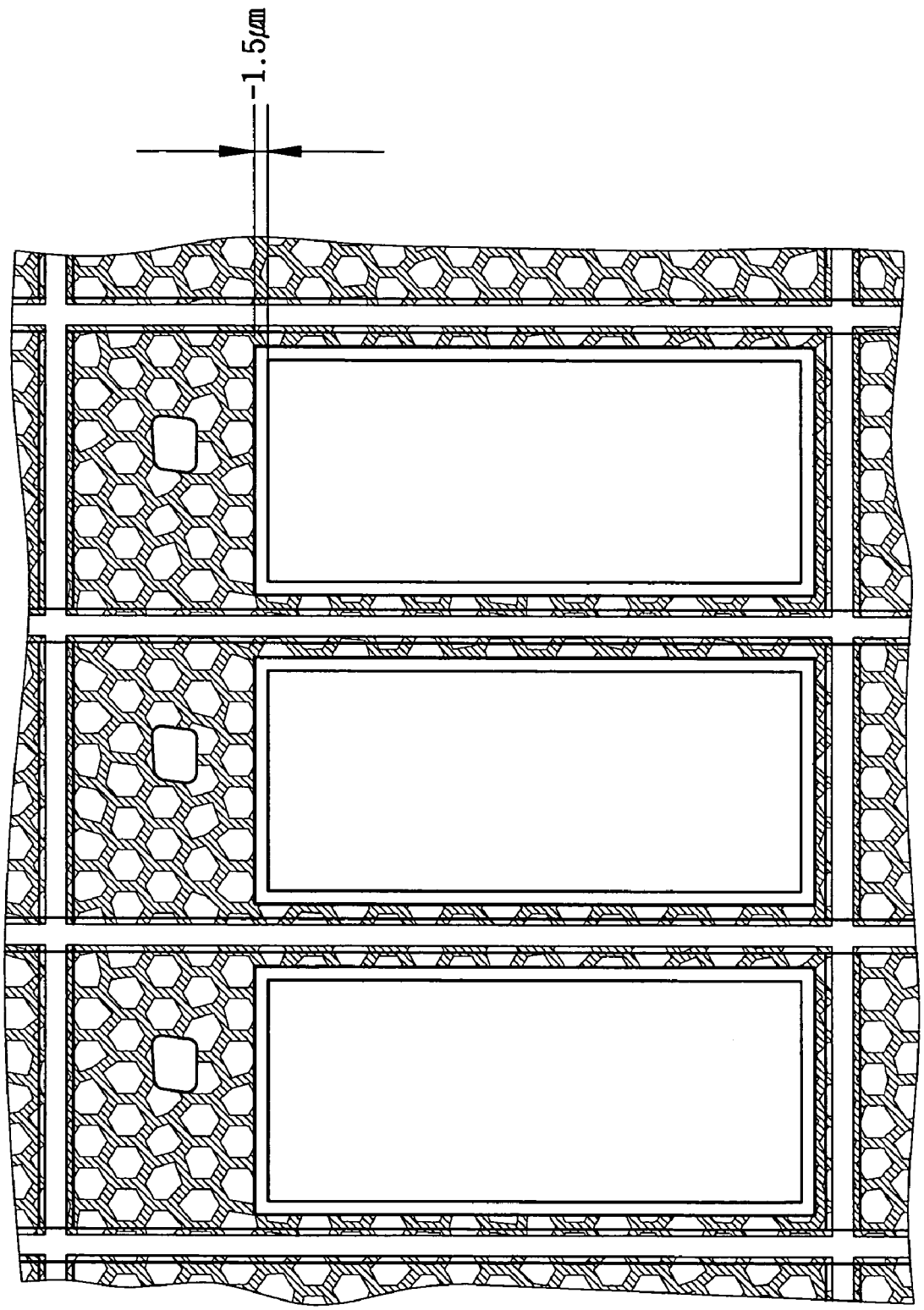

FIGS. 14A to 14D are plan views showing various reflective-transmissive type LCD apparatuses. Particularly, FIG. 14A shows a comparative example 1 that an edge of an opening of a reflecting plate corresponds with a boundary of a second area, FIG. 14B shows a comparative example 2 that an edge of an opening of a reflecting plate is overlapped with a second area by about 8 µm, FIG. 14C shows a comparative example 3 that an edge of an opening of a reflecting plate is overlapped with a second area by about 5 µm, and FIG. 14D shows a comparative example 4 that an edge of an opening of a reflecting plate is spaced apart from a second area by about 1.5 µm.

In the comparative example 1 shown in FIG. 14A, a reflecting plate has an opening substantially equal to that of a second area in size. In this case, since a cell gap of a liquid crystal layer corresponding to a first area is different from a cell gap of a liquid crystal layer corresponding to the second area, light may be leaked. Especially, when the reflective-transmissive type LCD apparatus having the reflecting plate as in the comparative example 1 is operated in a transmissive mode or a reflective mode, a disclination that causes an afterimage does not occur. However, a contrast ratio may be lowered due to leakage of the light in a reversed L-shape when the reflective-transmissive type LCD apparatus is operated in the transmissive mode.

In the comparative examples 2 and 3 shown in FIGS. 14B and 14C, since the all four edges of the opening of the reflecting plate are overlapped with the second area, the reflective-transmissive type LCD apparatus may prevent the leakage of the light as described in the comparative example 1. In a comparison of the comparative examples 2 and 3 with the comparative example 1, however, a reflectance of the reflecting plate may be enhanced due to the reflecting plate extended to the second area, thereby lowering the transmittance of the reflecting plate.

When the reflective-transmissive type LCD apparatus having the reflecting plate as in the comparative example 1 is operated in the reflective mode or the reflective-transmissive mode, the disclination occurs in an initial frame, and leakage of the light that affects the contrast ratio does not occur. Similarly, when the reflective-transmissive type LCD apparatus having the reflecting plate as the comparative example 1 is operated in the transmissive mode, the disclination occurs in an initial frame, and leakage of the light that affects the contrast ratio does not occur.

In case of the comparative example 4, since the second area increases and the reflecting plate decreases, the transmittance may be enhanced and the reflectance may be lowered.

As described above, when the reflective-transmissive type LCD apparatus is operated in the transmissive mode, the contrast ratio may be uniformly maintained by partially extending the edges of the opening of the reflecting plate to the second area in consideration of the rubbing direction of the liquid crystal layer.

Hereinafter, optical characteristics with respect to various comparative examples and embodiments according to the present invention will be described with reference to the following Table 1 and Table 2.

Table 1 represents the optical characteristics of the reflective-transmissive LCD apparatus operated in the reflective mode with respect to each of various comparative examples and embodiments. Table 2 represents the optical characteristics of the reflective-transmissive LCD apparatus operated in the transmissive mode with respect to each of various comparative examples and embodiments.

TABLE 1

| | Reflective mode | | | | |
| --- | --- | --- | --- | --- | --- |
| | White | Dark | | White | Color reproducibility |
| | (%) | (%) | C/R | X | Y | (%) |
| Comparative Example 5 | 8.4 | 0.23 | 36.5 | 0.3271 | 0.3779 | 25.7 |
| Comparative Example 6 | 9.7 | 0.23 | 42.2 | 0.3348 | 0.3603 | 14.7 |
| Comparative Example 7 | 11.9 | 0.3 | 39.7 | 0.3398 | 0.3671 | 15 |
| Comparative Example 8 | 8.7 | 0.2 | 43.5 | 0.3310 | 0.3500 | 16.6 |
| Comparative Example 9 | 9.3 | 0.28 | 33.2 | 0.3280 | 0.3574 | 15 |
| Embodiment 5 | 8.1 | 0.22 | 36.8 | 0.3192 | 0.3448 | 17.6 |
| Embodiment 6 | 8.1 | 0.26 | 31.2 | 0.3147 | 0.3320 | 17.5 |
| Embodiment 7 | 7.6 | 0.25 | 30.4 | 0.3121 | 0.3255 | 15.5 |
| Embodiment 8 | 8.3 | 0.25 | 33.2 | 0.3006 | 0.3321 | 18.4 |

In Table 1, the reflectance concerning the white and the dark is reflectance obtained with respect to a reference reflectance, for example, such as a condition assumed that brightness when barium sulfate (BaSO4) fluoresces is about 100%.

type LCD apparatus having the top-ITO structure is used in the comparative examples 6 to 9. The comparative example 6 represents a reflective-transmissive type LCD apparatus that an edge of an opening of a reflecting plate corresponds with a boundary of a second area. The comparative example 7 represents a reflective-transmissive type LCD apparatus that an edge of an opening of a reflecting plate is spaced apart from a second area by about 0.5 µm. The comparative example 8 represents a reflective-transmissive type LCD apparatus that an edge of an opening of a reflecting plate is spaced apart from a second area by about 1.0 µm. The comparative example 9 represents a reflective-transmissive type LCD apparatus that an edge of an opening of a reflecting plate is spaced apart from a second area by about 1.5 µm.

A reflective-transmissive type LCD apparatus having the bottom-ITO structure is used in the embodiments 5 to 8. The reflective-transmissive type LCD apparatus in the embodiments 5 to 8 has a structure having at least two sides of a transmission window overlapped with a reflecting plate. Especially, the embodiment 5 represents a reflective-transmissive type LCD apparatus having a reflecting plate overlapped with the transmission window by about +0.5 µm. The embodiment 6 represents a reflective-transmissive type LCD apparatus having a reflecting plate overlapped with the transmission window by about +1.0 µm. The embodiment 7 represents a reflective-transmissive type LCD apparatus having a reflecting plate overlapped with the transmission window by about +3.0 µm. The embodiment 8 represents a reflective-transmissive type LCD apparatus having a reflecting plate overlapped with the transmission window by about +5.0 µm.

According to Table 1 and Table 2 as described above, the reflective-transmissive type LCD apparatus having the uniform cell gap has optical characteristics similar to those of the reflective-transmissive type LCD apparatus having the non-uniform cell gap.

In a viewpoint of the white brightness of the transmissive mode, the reflective-transmissive type LCD apparatus having

TABLE 2

| | Transmissive mode | | | | | | |
| --- | --- | --- | --- | --- | --- | --- | --- |
| | Transmittance | White | Dark | | Max. | White | | Color Reproducibility |
| | (%) | (Cd/m²) | (Cd/m²) | C/R | C/R | X | Y | (%) |
| Comparative Example 5 | 3.69 | 72 | 94 | 76.6 | 140 | 0.3186 | 0.3415 | 26.8 |
| Comparative Example 9 | 7.78 | 140.1 | 133 | 105.3 | 121.9 | 0.3239 | 0.333 | 24.9 |
| Comparative Example 10 | 7.77 | 144.3 | 133 | 108.5 | 132.9 | 0.3241 | 0.3335 | 25.3 |
| Comparative Example 11 | 7.78 | 149.6 | 187 | 800 | 90 | 0.3322 | 0.3393 | 25.2 |
| Comparative Example 12 | 7.97 | 154.4 | 185 | 835 | 119.1 | 0.3339 | 0.3409 | 25.6 |
| Embodiment 9 | 7.25 | 138.4 | 99 | 139.8 | 143.7 | 0.3199 | 0.3313 | 27.4 |
| Embodiment 10 | 7.55 | 146.1 | 17 | 859 | 184.1 | 0.3244 | 0.3353 | 26.9 |
| Embodiment 11 | 7.38 | 143.1 | 123 | 116.3 | 264.1 | 0.3263 | 0.3364 | 27 |
| Embodiment 12 | 6.8 | 129.3 | 85 | 152.1 | 230.2 | 0.3236 | 0.3353 | 28 |

The comparative example 5 is a reflective-transmissive type LCD apparatus having a substantially uniform cell gap, and each of comparative examples 6 to 9 and embodiments 5 to 8 is a reflective-transmissive type LCD apparatus having a non-uniform cell gap. Particularly, a reflective-transmissive the non-uniform cell gap is superior to the reflective-transmissive type LCD apparatus having the uniform cell gap. As represented by the embodiments 5 to 8, although the edge of the opening of the reflecting plate is partially extended to the second area, the optical characteristics of the reflective-transmissive type LCD apparatus are similar to those of the reflective-transmissive type LCD apparatus represented by the comparative examples 5 to 8 when the reflective-transmissive type LCD apparatus is operated in the reflective mode or the transmissive mode.

According to the array substrate and the reflective-transmissive type LCD apparatus having the array substrate, the edge that defines the opening of the reflecting plate is partially extended to and overlapped with the transmission window in accordance with the rubbing direction of the liquid crystal layer. Thus, the reflective-transmissive type LCD apparatus may prevent losses of the transmittance and the reflectance thereof, and occurrence of the afterimage and leakage of the light caused by the cell gap difference between the first area and the second area may be also prevented.

In the reflective-transmissive type LCD apparatus having the bottom-ITO structure, the edge that defines the opening of the reflecting plate is overlapped with the transmission window in the reversed L-shape when the liquid crystal layer is rubbed in the direction of about 10 o'clock. Therefore, the reflective-transmissive type LCD apparatus having the non-uniform cell gap may be completed without occurrence of the afterimage and leakage of the light.

Since the reflective-transmissive type LCD apparatus having the bottom-ITO structure does not need the contact hole that directly connects the reflecting plate to the drain electrode of the switching device, the reflective-transmissive type LCD apparatus may enhance the first area, thereby improving the reflection efficiency.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display apparatus comprising:
   a first substrate having a first area and a second area;
   a switching device formed on the first substrate;
   a first insulating layer formed on the switching device;
   a pixel electrode formed on the first insulating layer and connected to the switching device;
   a second insulating layer formed on the pixel electrode and in the first area;
   a reflecting plate formed on the second insulating layer;
   a second substrate facing the first substrate;
   a liquid crystal layer interposed between the first and second substrates and including liquid crystal molecules rubbed along a predetermined direction; and
   a third insulating layer formed between the pixel electrode and the reflecting plate,
   wherein the reflecting plate partially overlaps with the second area.

2. In a liquid crystal display apparatus that displays an image using an artificial light or a natural light passing through a liquid crystal layer, the liquid crystal display apparatus comprising:
   a first substrate;
   a switching device formed in a pixel area that is defined by a gate line and a source line disposed on the first substrate, the gate line extended in a first direction and arranged in a second direction substantially perpendicular to the first direction, the source line extended in the second direction and arranged in the first direction;
   a pixel electrode connected to a drain electrode of the switching device;
   a reflecting plate disposed on the pixel electrode wherein the pixel electrode has a first height at a first area and a second height at a second area, wherein the first height is greater than the second height with respect to the first substrate, and wherein the reflecting area has a first edge extended into the second area;
   an insulating layer formed on the switching device and the first substrate with a first contact hole through which the drain electrode is partially exposed;
   an organic insulating layer formed on the first area with a second contact hole corresponding to the first contact hole so as to expose the drain electrode; and
   an protecting layer formed on the pixel electrode connected to the drain electrode through the second and first contact holes,
   wherein the reflecting plate is formed on the protecting layer.

3. The liquid crystal display apparatus of claim 2, further comprising:
   a second substrate; and
   a color pixel disposed on the second substrate, the color pixel having a first thickness at a position corresponding to the first area and a second thickness at a position corresponding to the second area, which is thicker than the first thickness,
   wherein the liquid crystal layer is disposed between the first and second substrates, and has a first thickness at the position corresponding to the first area and a second thickness at the position corresponding to the second area, which is thicker than the first thickness.

4. The liquid crystal display apparatus of claim 3, further comprising:
   a first alignment layer formed on the reflecting plate and rubbed in a first direction so as to align the liquid crystal layer; and
   a second alignment layer formed on the color pixel and rubbed in a second direction opposite to the first direction so as to align the liquid crystal layer,
   wherein the liquid crystal layer is aligned in a homogeneous alignment state by the first and second alignment layers.

5. In a liquid crystal display apparatus that displays an image using an artificial light or a natural light passing through a liquid crystal layer, the liquid crystal display apparatus comprising:
   a first substrate;
   a switching device formed in a pixel area that is defined by a gate line and a source line disposed on the first substrate, the gate line extended in a first direction and arranged in a second direction substantially perpendicular to the first direction, the source line extended in the second direction and arranged in the first direction, and the switching device having a gate electrode extended from the gate line, a source electrode extended from the source line and a drain electrode spaced apart from the source electrode;
   an insulating layer formed on the switching device and the first substrate with a contact hole through which the drain electrode is partially exposed;
   a pixel electrode partially formed on the insulating layer, and connected to the drain electrode through the contact hole;
   an organic insulating layer formed on the insulating layer and the pixel electrode in a first area to expose the pixel electrode corresponding to a second area;
   a protecting layer formed on the organic layer corresponding to the first area; and a reflecting plate disposed on the protecting layer, the reflecting plate having a first edge extended to the second area to connect the reflecting plate to the pixel electrode.

6. The liquid crystal display apparatus of claim 5, further comprising:
a second substrate; and
a color pixel disposed on the second substrate, the color pixel having a first thickness at a position corresponding to the first area and a second thickness at a position corresponding to the second area, which is thicker than the first thickness,
wherein the liquid crystal layer is disposed between the first and second substrates, and has a third thickness at the position corresponding to the first area and a fourth thickness at the position corresponding to the second area, which is thicker than the third thickness.

7. The liquid crystal display apparatus of claim 5, further comprising:
a first alignment layer formed on the reflecting plate and rubbed in a first direction; and
a second alignment layer formed on the color pixel and rubbed in a second direction opposite to the first direction,
wherein the liquid crystal layer is aligned in a homogeneous alignment state by the first and second alignment layers.

8. The liquid crystal display apparatus of claim 5, wherein a width of the pixel electrode in the first direction is substantially equal to or smaller than a width of the pixel area in the first direction.

9. The liquid crystal display apparatus of claim 5, wherein widths of the pixel electrode in the first and second directions are substantially equal to or smaller than widths of the pixel area in the first and second directions, respectively.

10. The array substrate of claim 2, wherein the edge of the reflecting plate is extended from two sides of a transmissive window.

11. The array substrate of claim 10, wherein a length of the edge of the reflecting plate is about 8 μm.

12. The array substrate of claim 5, wherein the first edge of the reflecting plate is extended from two sides of a transmissive window.

13. The array substrate of claim 12, wherein a length of the first edge of the reflecting plate is about 8 μm.

14. The liquid crystal display apparatus of claim 1, wherein the pixel electrode is electrically connected to the switching device through a contact hole that is formed through the first insulating layer.

15. The liquid crystal display apparatus of claim 1, further comprising:

a third insulating layer formed on the second insulating layer.

16. The liquid crystal display apparatus of claim 1, wherein a portion of the reflecting plate makes contact with the pixel electrode in the second area.

17. The liquid crystal display apparatus of claim 1, wherein the reflecting plate overlaps with at least one of the lower and right sides of the second area in a plan view, when a rubbing direction of the liquid crystal molecules is in about ten o'clock on the first substrate.

18. The liquid crystal display apparatus of claim 1, wherein the reflecting plate overlaps with the lower side of the second area in a plan view, when a rubbing direction of the liquid crystal molecules is in about twelve o'clock on the first substrate.

19. The liquid crystal display apparatus of claim 1, wherein reflecting plate overlaps with at least one of the lower and left sides of the second area in a plan view, when a rubbing direction of the liquid crystal molecules is in about one o'clock on the first substrate.

20. The liquid crystal display apparatus of claim 1, wherein the second substrate includes a color pixel having first thickness in the first area and second thickness in the second area, and the first thickness is different from the second thickness.

21. An array substrate comprising:
a substrate having a first area and a second area;
a switching device formed on the substrate;
a first insulating layer formed on the switching device;
a second insulating layer formed on the first insulating layer and in the first area;
a pixel electrode formed on the first insulating layer and connected to the switching device;
a third insulating layer; and
a reflecting plate formed on the third insulating layer,
wherein the reflecting plate is formed in the first area, and the third insulating layer is formed between the pixel electrode and the reflecting plate.

22. The array substrate of claim 21, wherein a portion of the reflecting plate is formed in the second area.

23. The array substrate of claim 21, wherein a portion of the third insulating layer is formed in the second area.

24. The array substrate of claim 21, wherein the third insulating layer is formed only in the first area.

25. The array substrate of claim 21, wherein the pixel electrode is electrically connected to the switching device through a contact hole that is formed through the first insulating layer.

26. The array substrate of claim 21, wherein the pixel electrode is electrically connected to the switching device through a contact hole that is formed through the second insulating layer.

* * * * *